(12) United States Patent
Starkey et al.

(10) Patent No.: US 12,542,007 B2
(45) Date of Patent: Feb. 3, 2026

(54) SYSTEMS AND METHODS FOR AUTOMATICALLY PREDICTING AND SCHEDULING VEHICLE REPAIRS

(71) Applicant: Cox Automotive, Inc., Atlanta, GA (US)

(72) Inventors: Hesham Starkey, Atlanta, GA (US); Jordan Smith, Atlanta, GA (US); Jonathan Snyder, Atlanta, GA (US); Bradley Barnes, Atlanta, GA (US)

(73) Assignee: Cox Automotive, Inc., Atlanta, GA (US)

( * ) Notice: Subject to any disclaimer, the term of this patent is extended or adjusted under 35 U.S.C. 154(b) by 340 days.

(21) Appl. No.: 18/066,816

(22) Filed: Dec. 15, 2022

(65) Prior Publication Data

US 2024/0203168 A1 Jun. 20, 2024

(51) Int. Cl.
*G07C 5/00* (2006.01)
*G06F 8/65* (2018.01)
*G06Q 10/20* (2023.01)
*G07C 5/08* (2006.01)
*G08G 1/0967* (2006.01)

(52) U.S. Cl.
CPC .............. *G07C 5/006* (2013.01); *G06F 8/65* (2013.01); *G06Q 10/20* (2013.01); *G07C 5/0808* (2013.01); *G07C 5/0825* (2013.01); *G08G 1/096725* (2013.01)

(58) Field of Classification Search
CPC .... G07C 5/006; G07C 5/0808; G07C 5/0825; G06F 8/65; G06Q 10/20; G08G 1/096725
USPC ........................................................ 701/31.6
See application file for complete search history.

(56) References Cited

U.S. PATENT DOCUMENTS

| 11,417,153 | B2 * | 8/2022 | Andres | G06Q 10/20 |
| 2013/0297143 | A1 * | 11/2013 | Chen | G06Q 50/40 701/29.6 |
| 2015/0012169 | A1 * | 1/2015 | Coard | G06Q 10/06316 705/305 |
| 2022/0169264 | A1 * | 6/2022 | Du | G07C 5/006 |

\* cited by examiner

*Primary Examiner* — Isaac G Smith
(74) *Attorney, Agent, or Firm* — Eversheds Sutherland (US) LLP

(57) ABSTRACT

Systems, methods, and computer-readable media are provided for automatically predicting and scheduling vehicle repairs. Particularly, a model (such as a natural language processing model, for example) may be trained using historical data relating to prior vehicle DTCs and actions taken to resolve the DTCs. The trained model may then be used to determine multiple potential resolutions to current DTCs provided by a vehicle. The model may also output probabilities associated with the various resolutions. Finally, the model may be configured to consider historical data associated with different types of vehicles than the current vehicle providing the DTC code. This allows for a larger data set to be considered by the model than if the model only considered data associated with the same type of vehicle.

16 Claims, 13 Drawing Sheets

SYSTEMS AND METHODS FOR AUTOMATICALLY PREDICTING AND SCHEDULING VEHICLE REPAIRS

BACKGROUND

Some conventional systems exist that may be used to diagnose vehicle issues and provide a recommendation of an action to take to resolve the issues (for example, a specific vehicle repair). For example, a significant number of vehicles are able to present a check engine light (CEL) on the dashboard to indicate an issue with the vehicle to a user. However, the CEL does not provide detailed information about the issue and how to resolve the issue. Rather, the CEL simply indicates that the vehicle is experiencing a general type of issue. A device, such as an OBD-II device, may also be inserted into an onboard diagnostics (OBD)-II port of the vehicle to obtain information from the vehicle, such as any diagnostic trouble codes (DTCs) that are produced by the vehicle. Such codes may provide a more detailed description of the issue that the vehicle is experiencing, but fail to help the user identify a particular action to take to resolve the issue. While these solutions may assist a user in diagnosing and resolving a vehicle issue, there exists a need for a more effective system for diagnosing and resolving vehicle issues.

BRIEF DESCRIPTION OF THE DRAWINGS

The detailed description is set forth with reference to the accompanying drawings. The drawings are provided for purposes of illustration only and merely depict example embodiments of the disclosure. The drawings are provided to facilitate understanding of the disclosure and shall not be deemed to limit the breadth, scope, or applicability of the disclosure. In the drawings, the left-most digit(s) of a reference numeral may identify the drawing in which the reference numeral first appears. The use of the same reference numerals indicates similar, but not necessarily the same or identical components. However, different reference numerals may be used to identify similar components as well. Various embodiments may utilize elements or components other than those illustrated in the drawings, and some elements and/or components may not be present in various embodiments. The use of singular terminology to describe a component or element may, depending on the context, encompass a plural number of such components or elements and vice versa.

FIG. 5 illustrates another example user interfaces, in accordance with one or more example embodiments of the disclosure.

FIG. 6 illustrates another example user interfaces, in accordance with one or more example embodiments of the disclosure.

FIG. 8 illustrates another example user interfaces, in accordance with one or more example embodiments of the disclosure.

FIG. 9A illustrates another example user interface, in accordance with one or more example embodiments of the disclosure.

DETAILED DESCRIPTION

Figure 1:
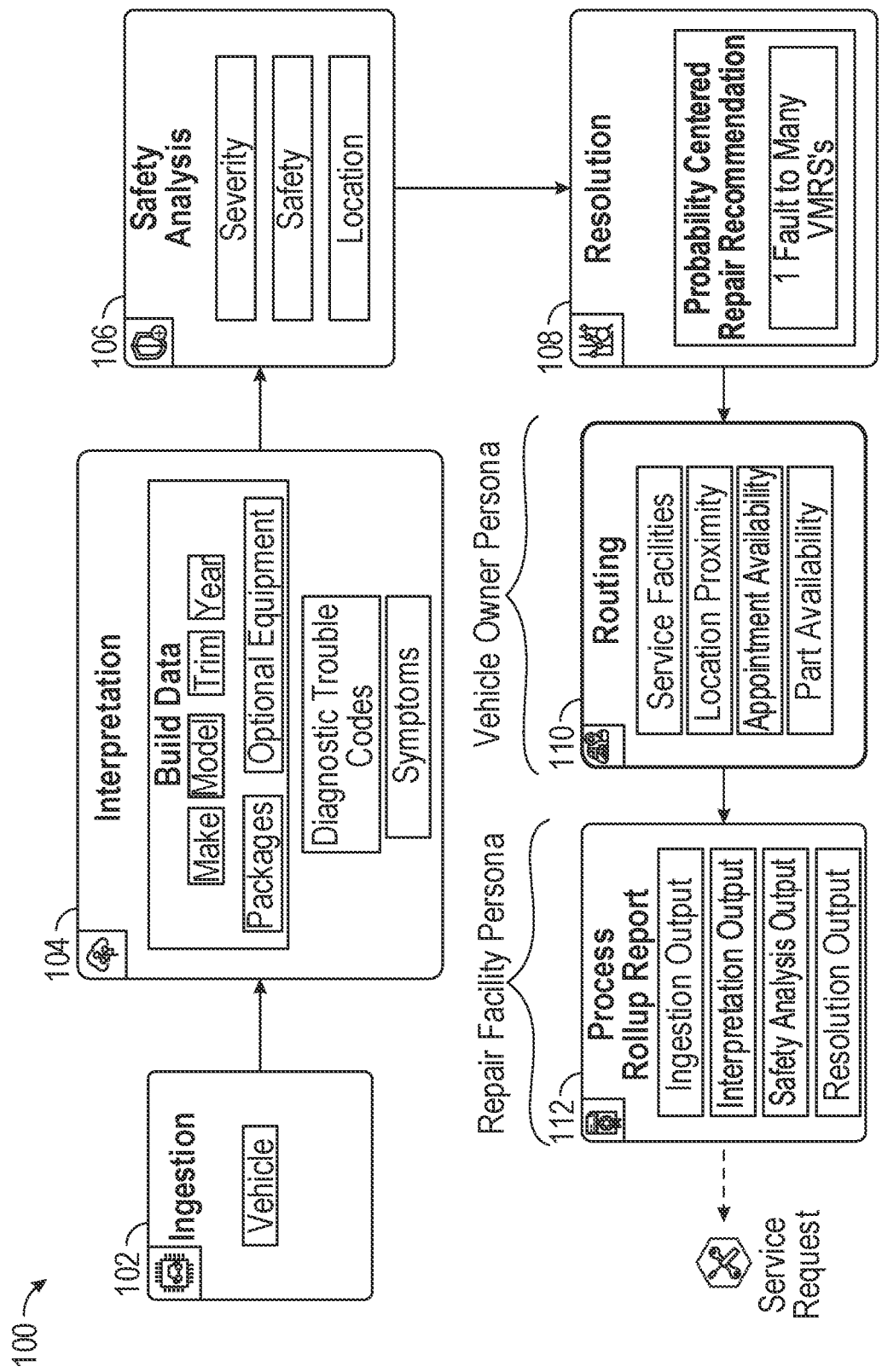
FIG. 1 illustrates an example flow diagram for an overall process, in accordance with one or more example embodiments of the disclosure.

This disclosure relates to, among other things, devices, systems, methods, computer-readable media, techniques, and methodologies for automatically predicting and scheduling vehicle repairs. The systems and methods described herein may automatically identify a plurality of potential solutions (generally referred to as "actions" herein) to resolve a vehicle fault. A "vehicle fault" may refer to any type of issue associated with a vehicle. For example, vehicle faults may include malfunctioning physical vehicle components, such as sensors, engine parts, brake pads, rotors, electronic control units (ECU), electrical systems, fuel lines, etc. Vehicle faults may also include faulty vehicle software. Vehicle faults may also include any other potential issues that may arise with a vehicle as well. Based on these potential solutions, a process may automatically be initiated to perform the action (as described in additional detail with respect to FIG. 1).

In one or more embodiments, the vehicle fault may be identified using a diagnostic trouble code (DTC) provided by a vehicle. A typical DTC includes a series of letters and numbers that provide different types of information about a vehicle fault. An example of a DTC is "P0301." The first letter may indicate a general vehicle system that is experiencing the fault (for example, "P" may refer to the vehicle powertrain). The first number following this letter may indicate whether the fault code is generic (SAE) or specific to an original equipment manufacturer (OEM). That is, some OEMs may have their own unique DTCs for their specific make and/or model vehicles that may not be applicable to vehicles produced by other OEMs. The second number may indicate a more specific vehicle system that the fault is associated with. For example, the number "3" may indicate an ignition system fault or an engine misfire. Finally, the last two numbers may provide a specific fault index, which may provide an indication of the specific fault that is identified in the vehicle.

Once identified, the DTC may be provided, along with other relevant data (also described in additional detail with respect to FIG. 1) to a model. The model may include artificial intelligence, machine learning, or the like. In one or more embodiments, the model may specifically be a natural language processing (NPL) bidirectional encoder representations from transformers (BERT) model (however, this is not intended to be limiting). The model may thus be trained, using historical data, to output multiple probabilities associated with multiple different types of actions that may be taken to resolve the vehicle fault. For example, the model may be trained using data including prior vehicle DTCs and actions taken to resolve the prior vehicle DTCs. The data may be obtained from any number of sources and may include any number of different types of vehicles, vehicle faults, actions, etc.

This model is advantageous over existing systems that predict resolutions to vehicle faults because the model provides multiple potential actions along with probabilities that each of the actions may resolve the vehicle fault. In contrast, conventional systems typically only provide an indication of one potential resolution to a vehicle fault. Some devices (such as OBD-II readers) may be even more simplistic and only provide an indication of the DTC code itself rather than a recommendation for an action. For example, an OBD-II reader may obtain a "P0505" DTC code from the vehicle that indicates an "idle control system malfunction." The model described herein may instead provide specific recommendations for actions to resolve this DTC code and associated probabilities that the different actions will successfully resolve the DTC code (a "one-to-many" approach rather than a conventional "one-to-one" approach). For example, the model may indicate that the fuel injectors of the vehicle may be replaced with a 70% probability of resolving the vehicle fault. The model may also indicate that an O2 sensor of the vehicle may be replaced with a 60% probability of resolving the vehicle fault. The model may also indicate any other number of actions (and/or combination of actions) with any other associated probabilities.

Additionally, the model described herein is also advantageous because it may be configured to consider historical data relating to different types of vehicles that may not necessarily be the same make and/or model as the vehicle currently experiencing the fault. For example, a subset of both the BMW 3-Series vehicles and the BMW 5-Series vehicles may share the same powertrain and drivetrain. Thus, although the two vehicles may not be the same model, data associated with a BMW 3-Series vehicle may still be used by the model to make action and probability determinations for a BMW 5-Series vehicle. In some instances, the model may be configured to provide different weighting values to the historical data based on the similarity of the vehicle and identified vehicle fault to the current vehicle and current vehicle fault being analyzed.

Furthermore, the model also allows for some or all the process for resolving the vehicle fault to be automated. For example, once a particular action (or actions) for resolving a vehicle fault is selected, a service facility may automatically be identified to resolve the vehicle fault and a service may automatically be scheduled with the service facility. If the vehicle is an autonomous vehicle, the vehicle may also be automatically routed to the service facility to perform the action (e.g., a vehicle repair and/or any other action) on the vehicle.

Turning to the figures, FIG. 1 illustrates an example flow diagram 100 for an overall process, in accordance with one or more example embodiments of the disclosure. The flow diagram 100 provides a comprehensive example of operations that may be performed beginning with data ingestion and ending with a resolution of the identified vehicle issue. Any of the operations described with respect to FIG. 1 may be performed by any device or system described herein (for example, user device 1102, server 1120, vehicle 1140, computing device 1200, etc.).

The flow diagram 100 begins with operation 102, which involves data ingestion. The data ingestion process may involve obtaining data from one or more vehicles. The data may include any number of different types of data relating to any number of different types of vehicle sub-systems (a "sub-system" may generally refer to any vehicle component or combination of vehicle components). For example, data relating to the electrical systems of the vehicle, a powertrain of the vehicle, a heating, ventilation, and air conditioning (HVAC) system, a computing system of the vehicle, and/or any other type of vehicle sub-system. In one or more embodiments, the data may specifically include any DTCs produced by the vehicle. Any of this vehicle-specific data may be captured from a controller area network (CAN) bus of the vehicle. The CAN bus is a communications network in the vehicle that allows various electronic control units (ECUs) and other types of microcontrollers and/or devices to communicate to facilitate operation and troubleshooting of the vehicle. Thus, obtaining data from the vehicle may, in some cases, involve obtaining data from the CAN bus and transmitting the data for processing. However, this is merely one manner in which data may be obtained from the vehicle, and data may also be obtained in any other manner. As another non-limiting example, the vehicle may include standalone devices, sensors, etc. that may not necessarily communicate data over the CAN bus, but may still provide vehicle-specific information for processing.

The data ingestion process may also involve obtaining data from any number of other data sources as well. For example, historical data relating to vehicle DTCs and actions that were taken to resolve the DTCs may also be obtained. This data may be collected from vehicles over time as the DTCs are identified and the vehicle faults are resolved. The data may also be obtained from data sources, such as databases that may store such information, rather than collecting the data from the vehicles themselves. For example, this data may be obtained from a service facility, one or more vehicles, an original equipment manufacturer (OEM), and/or any other entity that stores such data.

The data may also include non-vehicle data as well. Such non-vehicle data may include, for example, environmental data associated with the time at which the vehicle fault was identified may also be obtained. The non-vehicle data may also include any other types of data that may be useful in diagnosing a vehicle fault. For example, the ambient temperature of the external environment may have an impact on certain vehicle components, so temperature data may be useful data for the model to consider when determining one or more possible actions to resolve a vehicle fault.

With respect to data that is monitored to identify a fault, data may be obtained in any number of different ways. For example, a telematics system of the vehicle may be in communication with a remote server and may periodically (or continuously) send data to the remote server. As another example, a device may be provided in the vehicle that may obtain data from the vehicle (such as an OBD-II device that may be inserted into an OBD-II port of the vehicle to obtain DTCs from the vehicle). This device may also be configured to wirelessly transmit the data to the remote server. As a further example, the vehicle may include a number of sensors that may directly transmit data obtained from the vehicle. Data may also be obtained in any other number of ways using any number of devices, systems, etc. In embodiments in which the data is sent to the remote server, the remote server may perform processing to identify if the data indicates that a fault has occurred in the vehicle.

In some instances, the data processing may be performed locally by the vehicle as well. For example, the vehicle may be configured to analyze the data to identify the fault and may simply provide an indication of the fault to the remote server at the time the fault is detected, rather than periodically or continuously transmitting data for processing. In this manner, data transmission bandwidth requirements and data processing requirements for the remote server may be reduced. However, in some instances, it may be desired for the vehicle to continuously or periodically transmit all or some of the data being produced by the vehicle rather than only providing an indication when a DTC code is produced. Whether the vehicle continuously or periodically transmits the data or only indicates when a DTC code is produced may be automatically determined by the system and/or manually indicated by a user. Further, the types of data that are provided by the vehicle when the vehicle continuously or periodically transmits data may also be automatically determined by the system or manually indicated by a user as well.

Any of the data that is obtained from the vehicle may be monitored to identify when a vehicle fault has occurred. In one or more embodiments, a triggering condition for a fault being identified may include a DTC code being produced by the vehicle indicating a particular type of fault. However, this is not intended to be limiting and any other triggering conditions may also be applicable as well. For example, a vehicle fault may be identified based on recorded audio relating to the vehicle (for example, sounds being produced by the engine, the brakes, etc.). A vehicle fault may also be manually indicated by a user. A vehicle fault may also be identified in any other manner based on any other types of data as well.

Additionally, the remote server may also be configured to perform bidirectional communications with the vehicle. This allows the remote server to transmit particular requests to the vehicle. For example, the remote server may transmit a request for a specific type of data. The remote server may also transmit an indication to switch between continuously transmitting data to the remote server, periodically transmitting data to the remote server, only transmitting an indication of a DTC code, only providing data upon request from the server, etc. The remote server may also provide more granular instructions to the vehicle, such as a specific time interval associated with periodic data transmissions.

Once a vehicle fault is identified, the vehicle may also provide any other types of relevant data that may be used by the model to diagnose the fault and determine one or more actions to take to resolve the vehicle fault. For example, the vehicle may provide mileage data and/or any other types of data. Additionally, any of the data may be timestamped to provide a clear indication of the status of various subsystems and components of the vehicle at particular times. As aforementioned, in some instances, this additional data may only be sent upon identifying that the vehicle fault has occurred. However, in instances in which data is periodically or continuously transmitted, this may not be necessary, as the data may already be provided.

Operation 104 involves performing data interpretation. Given that the data that is provided to the model may be a number of different types of data from various sources, the data may not necessarily be standardized. A first aspect of the data interpretation may involve vehicle identification number (VIN) decoding. For example, any data that represents the vehicle build or configuration may be identified by decoding the VIN data. A second aspect of data interpretation may involve a mapping of DTCs to a textual description of the codes. A third aspect of data interpretation may involve performing vehicle symptom(s) mapping to any models (e.g., artificial intelligence or machine learning models) as an additional factor. For example, the model(s) may indicate that the fuel injectors of the vehicle may be replaced with a 70% probability of resolving the vehicle fault. The model may also indicate that an O2 sensor of the vehicle may be replaced with a 60% probability of resolving the vehicle fault. These existing examples can be refined to increase confidence in the probability determination using the process provided above.

Operation 106 involves performing a safety and/or severity analysis. For example, a safety analysis may determine whether the vehicle should be operated by a driver given the vehicle fault. For example, if the DTC code indicates a minor vehicle fault, such as a loose gas cap, then the vehicle may be safe to operate. However, if the DTC code indicates an engine issue, such as an issue with an engine sensor, then this pose more of a risk to the driver if the vehicle is continued to be operated. The severity analysis may determine if continuing to operate the vehicle may cause further damage to the vehicle. These analyses may also consider data such as time of day, proximity to a road, etc. These results of these analyses may be considered when service centers are identified that may be used to resolve the vehicle fault (for example, automatically identified by the system or manually identified by the user).

Operation 108 involves determining one or more potential actions to resolve the vehicle fault. An "action" may include, for example, a repair or replacement of a physical vehicle component. For example, if a vehicle fault is associated with an engine of a vehicle, depending on the specific type of vehicle fault, an action may include replacing a camshaft of the vehicle, replacing an O2 sensor of the vehicle, and/or replacing any other types of physical vehicle engine component. If a vehicle fault is associated with a brake system of the vehicle, the action may include, for example, replacing brake pads, calipers, or rotors, flushing a brake line, etc. If the vehicle fault is associated with an electrical system of the vehicle, the action may include, for example, replacing a battery of the vehicle, re-wiring the electrical system, etc. The action may also include performing an oil change and/or coolant flush. These are merely a few examples of different types of actions that may be performed to resolve vehicle faults with physical vehicle components and are not intended to be limiting in any way.

Another example of an action may include a software update for the vehicle. For example, software used by an electronic control unit (ECU) of the vehicle may cause the ECU to improperly control the vehicle. As a more specific example, an ECU controlling the engine of the vehicle may be programmed to cause a certain mixture of fuel and air to be provided to the engine and causing an improper ratio of fuel and air to be provided to the engine may result in improper functioning of the engine. As another example, software associated with an infotainment system of the vehicle may result in issues with a navigation system of the vehicle. A software update to the vehicle infotainment system may serve to resolve this issue. An action may also include any other task that may be performed to resolve an identified vehicle fault.

In some instances, the action may be automatically performed to resolve the vehicle fault. For example, if the vehicle fault is associated with software of the vehicle, then a software update may automatically be transmitted to the vehicle. The software update may then be automatically installed by the vehicle to resolve the vehicle fault. In other instances, the action may involve a technician performing a repair of the vehicle, such as replacing a faulty vehicle component. Further operations associated with such manual repairs (which may still involve automated tasks) are described in additional detail with respect to operations 110-112.

As aforementioned, the approach described herein is advantageous in that rather than providing an indication of one action to take to resolve the vehicle fault, multiple potential actions may be identified and presented to a user. Each individual action may be associated with a determined probability that the action would result in the resolution of the vehicle fault. For example, the model may output an indication that the fuel injectors of the vehicle may be replaced with a 70% probability of resolving the vehicle fault. The model may also indicate that an O2 sensor of the vehicle may be replaced with a 60% probability of resolving the vehicle fault. The model may also indicate any other number of actions (and/or combination of actions) with any other associated probabilities. In this manner, a user may be provided with multiple possible repair options (or other actions to take) along with indications of probabilities that the different options are likely to resolve the vehicle fault.

In some cases, additional information pertinent to each action may also be provided as well. In addition to the probability metrics, an estimated amount of time for the action to be performed may also be determined. For example, an action including an oil change may be associated with an estimated time of 30 minutes. An action including a replacement of a camshaft may result in an estimated time of several days. The amount of time that the repair is likely to last before a similar vehicle fault may occur may also be provided. For example, one action determined by the model may only be a temporary fix for the vehicle fault and may ultimately require a longer-term solution. Another action may be a more permanent fix, but may be costly, take a longer period of time to perform, etc.

All this information may allow a user to make a more informed decision about an action that they desire to take to attempt to resolve the vehicle fault. For example, a first user may be more concerned with cost and may select a more temporary fix. Another user may rather implement a longer-term solution and may be willing to leave the vehicle at a service facility for multiple days. In embodiments in which the model automatically selects one action (or a subset of possible actions), this information may also be used by the model to make such selections as well.

In one or more embodiments, the model may be trained to determine the actions and associated probabilities. The model may specifically be trained using historical data relating to vehicle faults previously identified in other vehicles and the actions that were taken to resolve those vehicle faults. This allows the model to identify actions that were able to resolve prior vehicle faults that may be the same (or similar) type of vehicle fault.

In one or more embodiments, the model may also be configured to consider data associated with vehicles that are not necessarily the same model as the current vehicle with the vehicle fault that is being analyzed by the model. The model may be trained with historical data associated with a wide array of different types of vehicle years, makes, models, trims, etc. Also, given that there is often a lengthy life for OEM-produced models, issues, causes, recalls, and other types of data that are observed in earlier production models may be used to inform later production models. For example, data obtained from vehicles manufactured in 2018, 2019, and 2020 may gather miles naturally, and help inform the model for model year 2021, 2022, and 2023 vehicles.

Thus, rather than the model being constrained to only considering historical data relating to the exact vehicle make and model as the vehicle currently experiencing the vehicle fault, the model may also consider any of the other historical data as well. In some cases, the data may be weighted based on the similarities between the current vehicle and the vehicles associated with the historical data. For example, data associated with an exact make and model equivalent may be weighted higher than data associated with a different make and/or model vehicle.

The weighting may also be provided at a more granular level than just based on make and/or model. Even though two vehicles may be different makes and/or models, they may share similar components. For example, a first vehicle of a first make and model may share an engine with a second vehicle that is a different make and model. Thus, data associated with a previous fault in the engine of the second vehicle may be relevant to a current fault in the engine of the first vehicle even though the vehicle makes and models are not the same. This may be applicable to any other type of vehicle component as well. Thus, the model may adjust the weighting based on these types of factors as well.

The model may determine the probabilities associated with the various actions in a number of different ways. For example, the model may consider a number of correlations that exist between the particular vehicle fault and a corresponding action that resolved the fault. A larger number of correlations may correspond to a higher probability. As another example, the model may determine information about a vehicle, such as make, model, and year, along with a list of DTC events from the vehicle in accordance with the odometer at time of detection that can be mapped with a known repair order that falls inside close range to event and odometer of vehicle. As a further example, DTC events may be mapped across an OEM recommended service schedule.

The data processing requirements to determine the probabilities may be reduced in some cases by filtering the types of vehicle sub-systems that are analyzed by the model to identify the potential resolution actions. For example, as aforementioned, the DTC code includes a combination of letters and numbers that may be used to identify the relevant vehicle sub-system that is associated with the DTC code. Continuing the example provided above, a DTC code of "P0301" may indicate that a powertrain (based on the "P") is experiencing a fault. More particularly, the number "3" may indicate an ignition system fault or an engine misfire. Given this information, the model may disregard resolution actions relating to other vehicle sub-systems, such as the HVAC system, etc.

In one or more embodiments, the actions and probabilities produced by the model may also be automatically analyzed by a computing system (for example, user device 1102, server 1120, vehicle 1140, computing device 1200, etc.). The computing system may automatically determine one or more actions to take to resolve the vehicle fault. That is, rather than simply presenting a listing of the actions and probabilities to a user, one or more actions may automatically be selected to reduce the amount of manual interaction required by the user. In such embodiments, the selection of the action(s) may be performed by the same model that identified all the relevant actions and associated probabilities, by a different model, and/or by a more simplistic algorithm (for example, an algorithm that relies on a pre-established rule-set).

The automatic selection of the action(s) may be performed based on any number of different criteria. For example, an action may be selected that is most likely to provide the most long-term solution for the vehicle fault. An action may also be selected that will be the least costly to the user. An action may also be selected based on any number of different criteria as well. These preferences may be indicated by a user through user settings and/or may be automatically determined by the computing system. As aforementioned, the selection of the action may also be made based on information other than the probability metrics as well. For example, the computing system may consider service facility availability, parts availability, and/or the severity of a vehicle fault (for example, if the vehicle fault prevents the vehicle from being used, etc.). Any other number of types of data may also be considered by the computing system in making the selection.

In further embodiments, a selection may be automatically made by the computing system, but the selection may be presented to a user for confirmation. For example, the computing system may select an action of replacing a mass airflow sensor of a vehicle, which may have the highest probability of resolving a particular vehicle fault. However, the user may override this selection and may indicate that they desire a cheaper action to be performed (such as scheduling a service to clean the existing mass airflow sensor). This feedback loop may also be used to train the model used to make the selection (in embodiments in which a model is employed to make such a selection).

Operation 110 may involve performing routing determinations. That is, once any actions are selected by either the user or the computing system, the computing system may then automatically identify one or more service facilities that may be used to perform the action to resolve the vehicle fault (for example, perform a vehicle repair and/or any other type of action). The particular service facility may be selected based on a number of different criteria. A first criteria may include location information. For example, the system may determine the current location of the vehicle and may identify service facilities within a given distance from the current location of the vehicle. In some cases, the system may select the closest facility. However, the system may also consider other location information beyond just the current location of the vehicle as well. For example, the system may determine a location of a home address of the user, a place of the work of the user, and/or any other location that the user may frequently visit. The system may also consider a severity of the vehicle fault when determining the location of the service facility. For example, if the vehicle fault severity is significant enough that the vehicle is unable to operate (or is unable to operate for a long period of time), then the system may be more likely to select a closer service facility to resolve the vehicle fault. However, if the severity of the vehicle fault is less significant, then the system may weigh location proximity less heavily than other factors that may be considered when identifying a service facility.

Another example criteria may include scheduling availability of any potential service facility. For example, a first service facility may be booked for service repairs through a subsequent week. A second service facility, however, may include one or more available time slots available for booking. Thus, in some instances, the second service facility may be selected over the first service facility given the availability of the second service facility, even if the location of the first service facility is more favorable than the second service facility. Additionally, in some cases, the system may perform communications with the various service facilities to determine if any scheduled service repairs for other vehicles may be rescheduled to accommodate the current vehicle experiencing the vehicle fault.

An additional example criteria may include a type of service facility. For example, some service facilities may be OEM-specific (for example, a BMW service center, a Honda service center, etc.) and may only be equipped to provide service to specific makes and/or models of vehicles. Some service facilities may be equipped to handle a broader range of vehicles, but still may only be equipped to handle a subset of all possible vehicle types. For example, a service center may specialize in European or Japanese vehicles. Some service facilities, however, may be equipped to perform service on any type of vehicle.

A further example criteria may include the availability of vehicle parts that are required to perform the vehicle repair. For example, if a vehicle repair to resolve a vehicle fault requires a mass airflow sensor for a 2014 Honda Civic, the system may determine service facilities that have the part available in the timeframe in which the vehicle repair needs to be performed. The system may not only consider service facilities that have the parts currently available but may also consider an amount of time it may take for a service facility to receive the parts if the parts are not currently available. For example, if a preferred service facility does not currently have the mass airflow sensor but is able to acquire a sensor within a week, then this service facility may still be desirable over a less preferable service facility that has the mass airflow sensor currently available. These are just a few non-limiting examples of criteria that may be used by the model to identify one or more service facilities to perform the vehicle repair and any other criteria may also be considered as well.

Additionally, in some instances, service facilities may proactively order parts based on data being processed by the system. For example, one or more service facilities may be in communication with the system and may obtain data about common types of vehicle repairs that are performed for vehicles. Based on this data, the service facilities may ensure that more of the parts required to perform these repairs are in stock at any given time. This proactive ordering of parts may also be performed on the individual vehicle level. For example, if the system identifies that a specific vehicle requires a particular type of vehicle repair, an indication of such may be provided to a service center and the service center may automatically order the required parts before the vehicle is scheduled to arrive for the repair to be performed.

In one or more embodiments, the system may consider only the action that has the highest probability to result in a resolution of the vehicle fault when identifying the service facility to perform the action. The system may consider multiple actions of varying probabilities as well. For example, if there are no available service facilities within a particular region that can perform an action that is indicated to have the highest probability to resolve a vehicle fault, then the system may instead select a service facility that is able to perform an action associated with a second-highest probability, third-highest probability, etc. That is, the system may not necessarily automatically select the action associated with the highest probability but may consider a variety of factors that may resolve in an action associated with a lower probability being selected.

The system may also provide a listing of the potential actions to take and/or their associated probabilities and may receive a selection of one or more of the options from a user. Similarly, the system may allow a user to manually indicate criteria that the user desires for the system to weigh more heavily in identifying the service facility to select. Further, in some cases, the system may select multiple service facility options and present the options to the user for manual selection. In presenting the list, the system may indicate information associated with the service centers, such as scheduling availability, location, parts availability, user ratings, and/or any other information.

Operation 112 involves presenting some or all the information associated with any of the prior operations. Examples of user interfaces that may be presented to a user are illustrated in FIGS. 4-10.

In one or more embodiments, the resolution output may include a presentation of the potential actions determined by the model that may be taken to potentially resolve the vehicle fault. In some instances, the actions may be provided in a specific order, for example, in order from the highest probability of resolving the vehicle fault to the lowest probability of resolving the vehicle fault. Any other information may be presented along with the actions themselves. For example, the specific probability metrics may also be presented to the user. Estimated costs, available service facilities that are able to perform the action, and/or any other relevant information may also be presented to the user.

In one or more embodiments, the user interface may present only a subset of the potential actions that may be taken. The subset of the actions that are presented to the user, for example, may include any actions that have an associated probability above a threshold value. However, in some instances, all the actions may be presented to the user as well. The determination as to whether a subset of the actions or all the actions are presented to the user may be made automatically or based on a manual indication by a user (for example, a setting that may be established by a user through the user interface).

In one or more embodiments, operation 112 may also involve automated tasks to facilitate the resolution of the vehicle fault. For example, once a specific service facility is identified, a vehicle repair may automatically be scheduled with the service center. If the vehicle is an autonomous vehicle, navigation instructions may be provided to the vehicle and the vehicle may autonomously route to the service facility to perform the vehicle repair. If the action to resolve the vehicle fault involves a software update to the vehicle, then the software update may automatically be provided to the vehicle and installed in the vehicle. Any number of other automated tasks may also be performed.

Figure 2:
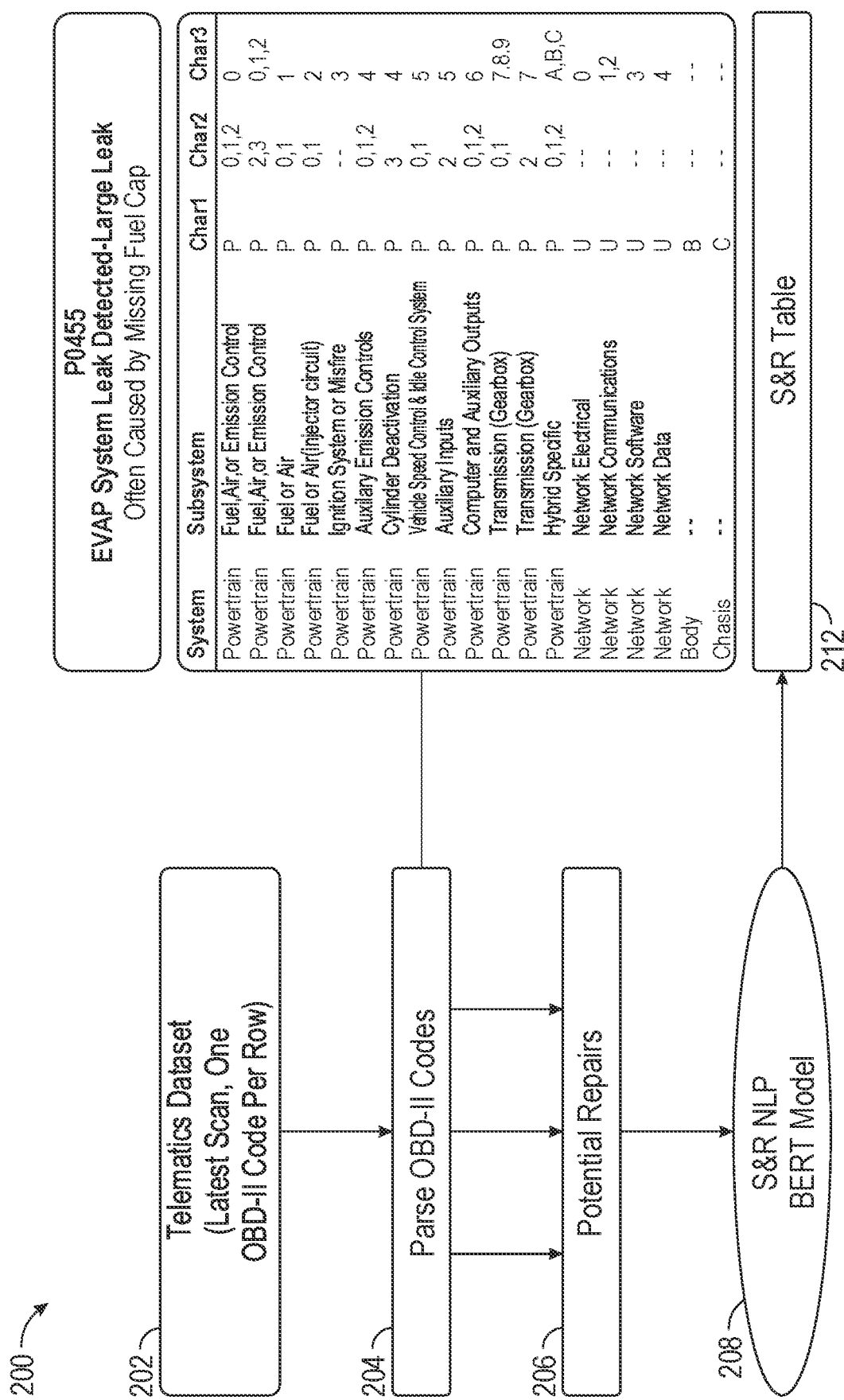
FIG. 2 illustrates an example flow diagram for identifying potential vehicle repairs, in accordance with one or more example embodiments of the disclosure.

FIG. 2 illustrates an example flow diagram 200 for identifying potential vehicle repairs, in accordance with one or more example embodiments of the disclosure. The flow diagram 200 may include operations performed by the model.

Operation 202 involves receiving vehicle data. Non-limiting examples of such data may include odometer readings, location data, DTC (e.g., OBD-II) codes that are in an active state on the vehicle, and/or any other types of data. Operation 204 involves mapping the DTCs to an existing data set of standard descriptions regarding the type of vehicle sub-system faults associated with the DTCs as well as any complimentary data that is available. Operation 206 involves mapping the DTCs to existing descriptions of work performed or actions taken to resolve any previous vehicle issues (associated with the same or other vehicles) associated with the same or similar DTCs. Operation 208 involves categorizing the descriptions of work performed or actions taken identified in operation 206. In one or more embodiments, the categorization may be performed using a natural language processing model, however, this is not intended to be limiting and any other type of machine learning model, artificial intelligence, or simple algorithm may be used to perform this categorization as well. Specifically, the categorization may be performed based on information include in a service and repair table 212.

The result of operation 208 may be that the DTCs are associated with a list of multiple potential actions (e.g., vehicle repairs or any other types of actions). The total number of services and repairs that may performed on a vehicle may be substantial, which may make building a predictive model difficult. However, in some cases, only a subset of repairs may be necessary to clear a given DTC (e.g. repairs to tires may be excluded if the DTC indicates engine issues). The NLP model allows for the identification of those potential repairs (or other actions) at scale by mapping text descriptions of repairs (or other actions) that may resolve a DTC to the corresponding service and repair category. Then, the probability of the repair (or other action) success in resolving the DTC may be modeled among that subset of the service and repair categories, instead of the entire universe of potential repairs (or other actions).

Figure 3:
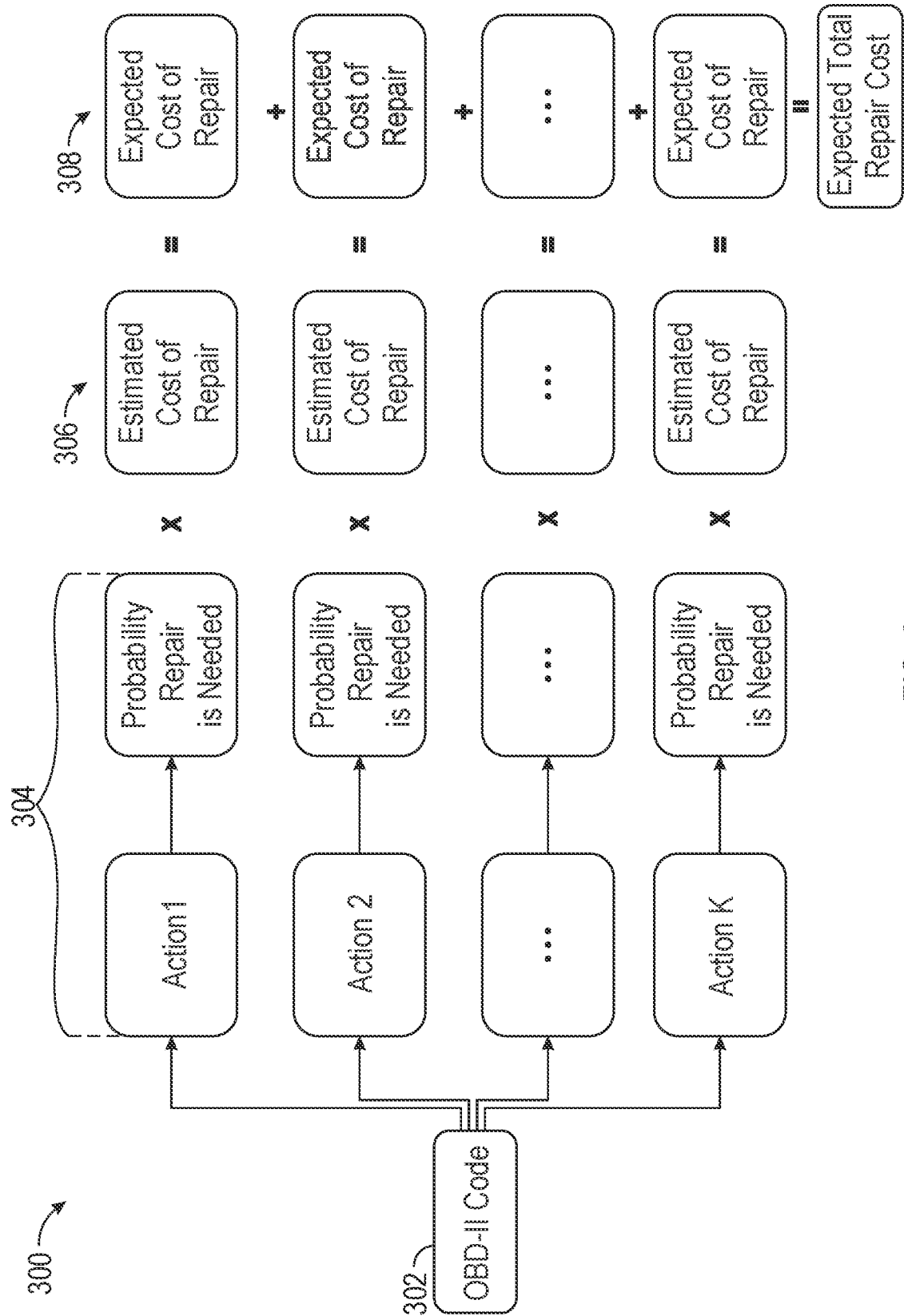
FIG. 3 illustrates an example flow diagram for determining an expected repair cost, in accordance with one or more example embodiments of the disclosure.

FIG. 3 illustrates an example flow diagram 300 for determining an expected repair cost, in accordance with one or more example embodiments of the disclosure. The flow diagram 300 may also include operations performed by the model.

The flow diagram 300 may begin with operation 302, which may involve receiving a DTC code from the vehicle. That is, operation 302 may correspond to operation 102 (data ingestion) shown in FIG. 1. Operation 304 may involve determining one or more potential actions (for example, FIG. 3 shows Action 1, Action 2, . . . , Action K) and probabilities associated with the actions. Operation 306 may involve determining a product of each probability value and an associated estimated cost of repair for that particular action. For example, a first repair may include replacing brake pads with an associated probability of 70% and an estimated cost of $400. A second repair may include replacing rotors with an associated probability of 50% and an estimated cost of $800. Thus, the result of operation 306 would be two values. A first value of (0.7)(400)=280 and a second value of (0.5)(800)=400. Finally, operation 308 may involve summing all the estimated cost of repairs to obtain the total expected repair cost for resolving the vehicle fault. Continuing the same example, the total expected repair cost would be $680. This information may also be presented to the user through the user interface (for example, shown in FIGS. 4-10).

In addition to the expected repair cost described in operations 302-306, in some instances, determinations may also be made as to a lowest possible cost and a highest possible cost associated with the potential actions. Continuing the above example, the lowest cost action may include replacing the brake pads of the vehicle at a cost of $400. In some cases, the determination as to the lowest possible cost may only consider actions that have greater than a threshold probability of resolving the vehicle fault. For example, an action may have an associated cost of $50, but may have a 10% probability of resolving the vehicle fault. This information may not be as valuable to the user because even though the $50 cost is lower than the $400 cost, the action associated with the $50 cost is unlikely to resolve the vehicle fault. The highest possible cost in this same example may a single action that is associated with a higher cost than any other single actions that may resolve the vehicle fault (for example, in this case the highest cost would be the $800 cost). The highest cost, however, may also include a cost associated with a combination of different actions as well (for example, the highest possible cost may also include a combination of the $400 action and the $800 action at a total cost of $1,200). An indication of the lowest possible cost and/or the highest possible cost may also be presented to a user along with the aforementioned expected cost. In some cases, only one of the highest cost, lowest cost, or expected cost may be presented to the user. The user may indicate which of these costs they wish to view (for example, through settings of an application) as well.

FIGS. 4-10 illustrate an example user interface 400, in accordance with one or more example embodiments of the disclosure. As non-limiting examples, the user interface 400 may be associated with an application, a website, standalone software, etc. The user interface 400 may be displayed to the user through any type of device, such as user device 202 of FIG. 2, computing device of FIG. 12, and/or any other device (e.g., a laptop computer, desktop computer, tablet, television, smartphone, etc.). It should be noted that the user interface 400 presented in FIGS. 4-10 is merely one example of such a user interface and is not intended to be limiting.

Figure 4:
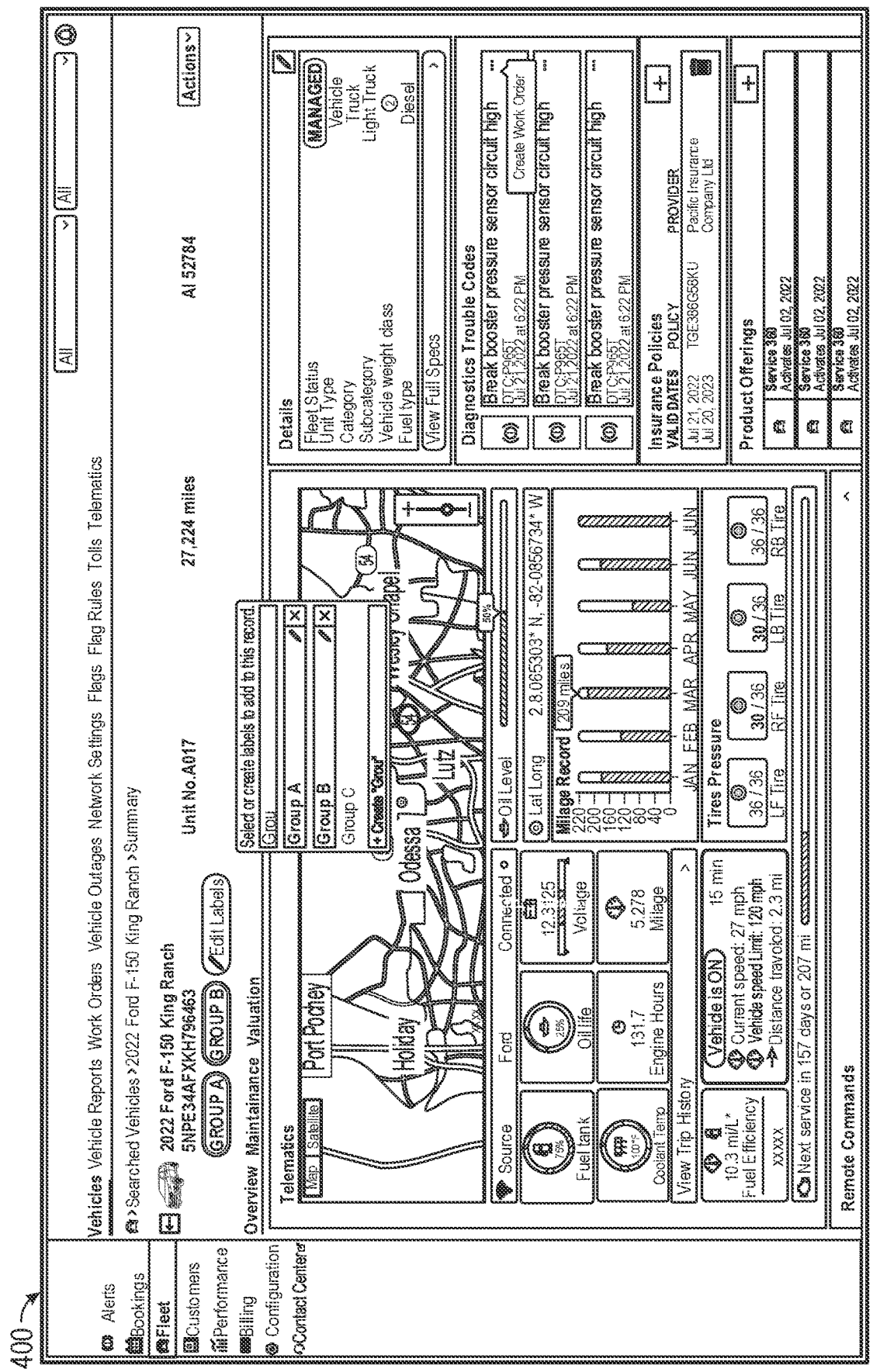
FIG. 4 illustrates an example user interfaces, in accordance with one or more example embodiments of the disclosure.

FIG. 4 provides an illustration of the user interface 400 displaying information about a specific vehicle to a user. For example, the user interface 400 shows a map including the current GPS location of the vehicle. The user interface 400 also shows various types of data about the vehicle, such as a fuel tank level, a remaining oil life, a battery voltage, a coolant temperature, an age of the engine, a mileage of the vehicle, individual tire pressure readings for all the tires, a fuel efficiency, a current vehicle speed, etc. The user interface 400 may also present other non-vehicle information, such as a speed limit associated with the location the vehicle is within. The user interface 400 may also present any other types of information illustrates in FIG. 4, as well as any other potential types of information that may be obtained from a vehicle (and/or any other non-vehicle data) that is not presented in the example illustration of FIG. 4. That is, the information presented in FIG. 4 is merely exemplary and is not intended to be limiting.

FIG. 4 also shows that the user interface 400 may present any DTCs provided by the vehicle. For example, the figure shows a DTC of P965T being provided by the vehicle. A timestamp associated with the DTC may also be provided. A user may be able to select the particular DTC through the user interface 400 and create a work order to resolve the vehicle fault associated with the DTC.

Figure 5:
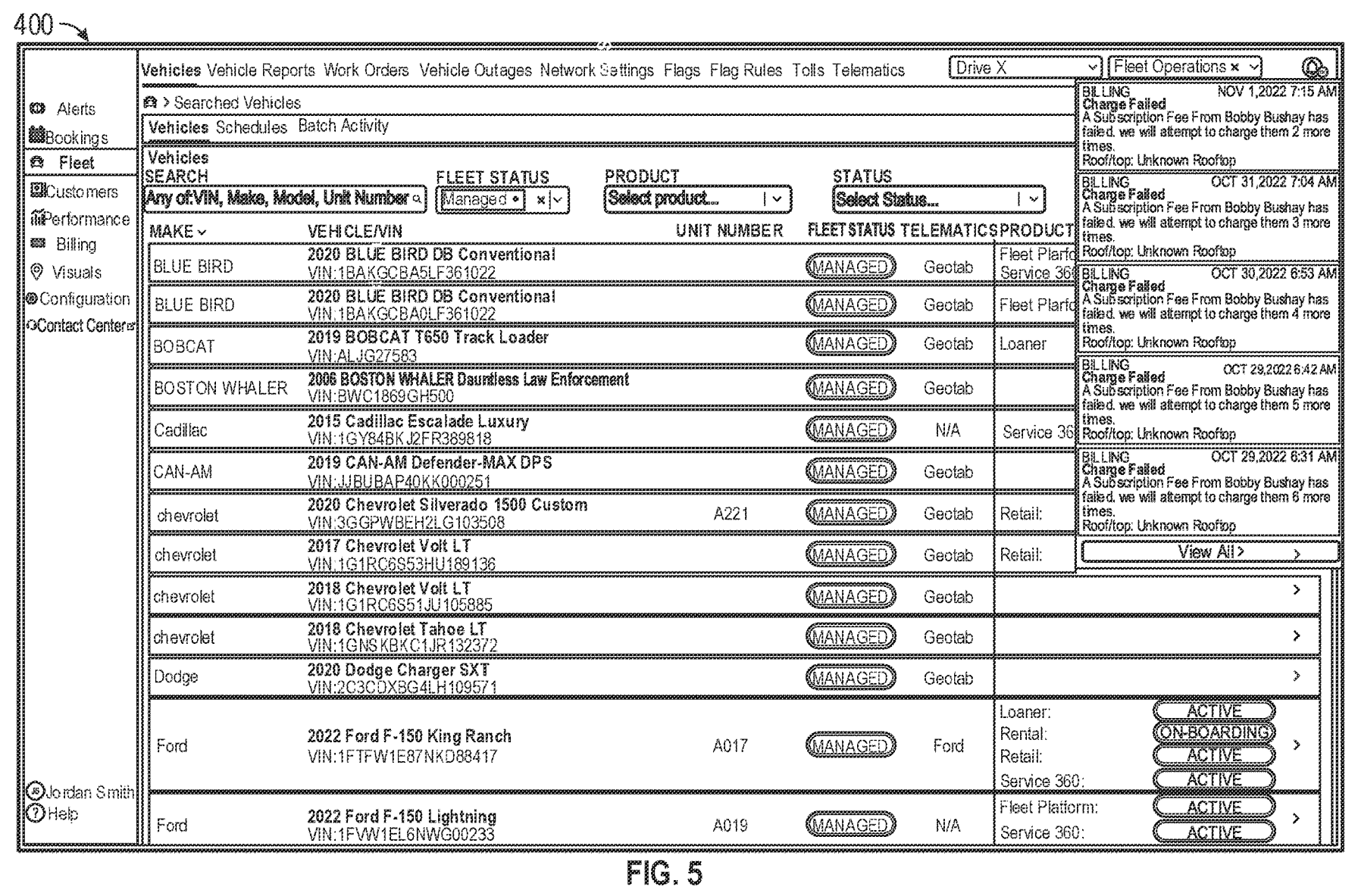

FIG. 5 illustrates that the user interface 400 may also present a listing of different vehicles that a user may select from to view additional information about a specific vehicle (for example, as illustrated in FIG. 4). For example, a user may manage a fleet of different vehicles and thus may need to monitor information associated with multiple different vehicles. This listing may provide certain high-level information to the user, such as a make and model of a vehicle, a vehicle identification number (VIN), a status of the vehicle, and/or any other type of information. In one or more embodiments, the vehicle status may provide an indication when a vehicle fault is identified (for example, a DTC code is provided by a vehicle). This may provide allow the user to determine which vehicles within the fleet are experiencing vehicle faults and may need an action to be performed to resolve the vehicle fault. The user may then select the vehicle to view the portion of the user interface 400 that displays information specific to the vehicle (for example, as shown in FIG. 4). The user may then initiate a work order to resolve the vehicle fault.

As aforementioned, the system may automatically initiate one or more actions to resolve the vehicle fault. For example, if any of the vehicles in the fleet are autonomous vehicles, a repair may be scheduled with a service facility and the autonomous vehicle may automatically be routed to the service center to perform the repair. As another example, if a software update is required, the software update may automatically be provided to the vehicle. Any of this information may also be provided to the user through the user interface 400 to allow the user to track the progress of resolving a vehicle fault. Additionally, notifications may be transmitted to a user device, such as a smartphone to indicate when changes in the status of the vehicle repair occur. For example, a notification may be provided when a vehicle is routed to a service center, a notification may be provided when a vehicle service is initiated, a notification may be provided when a vehicle repair is complete, etc.

Figure 6:
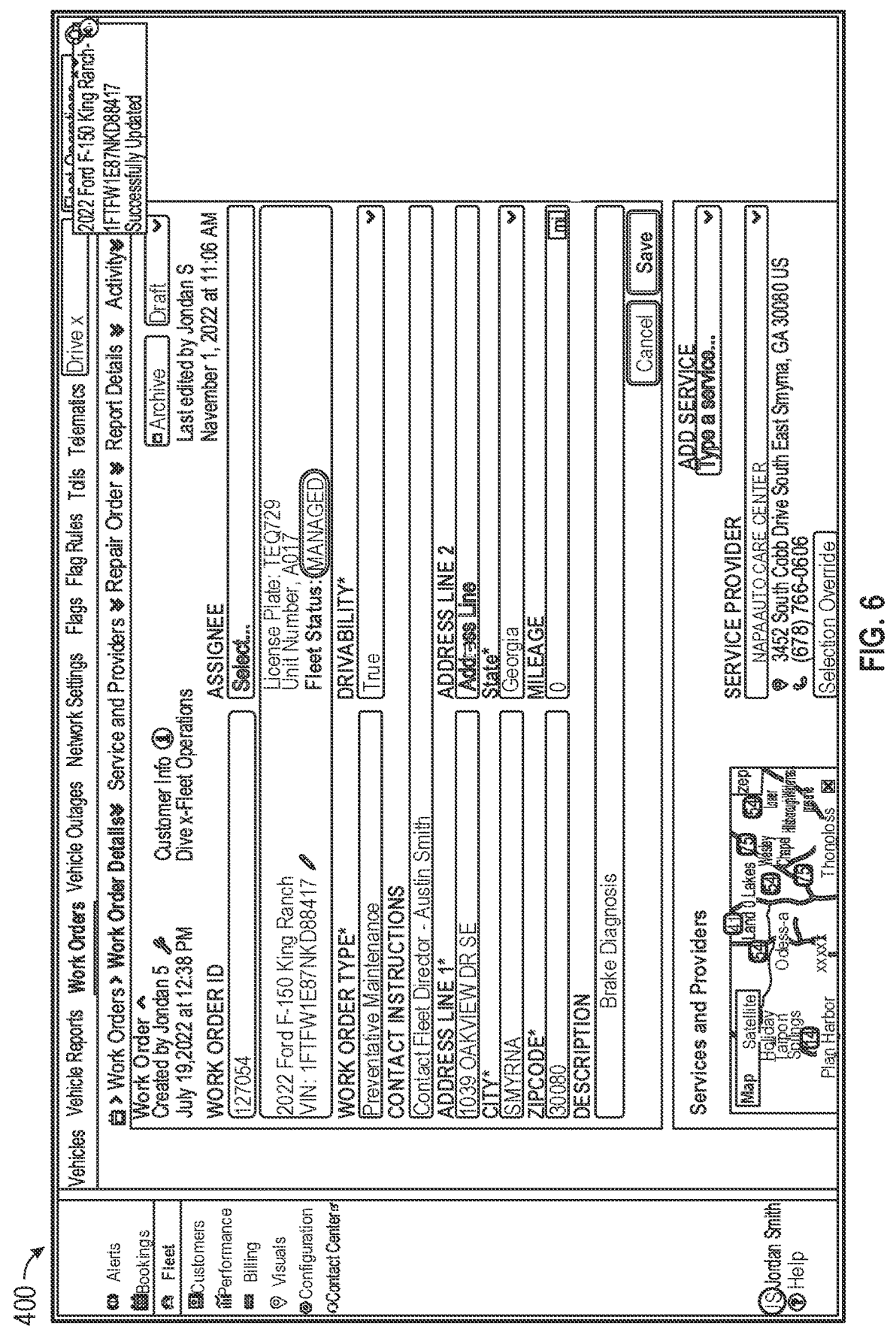
Figure 7:
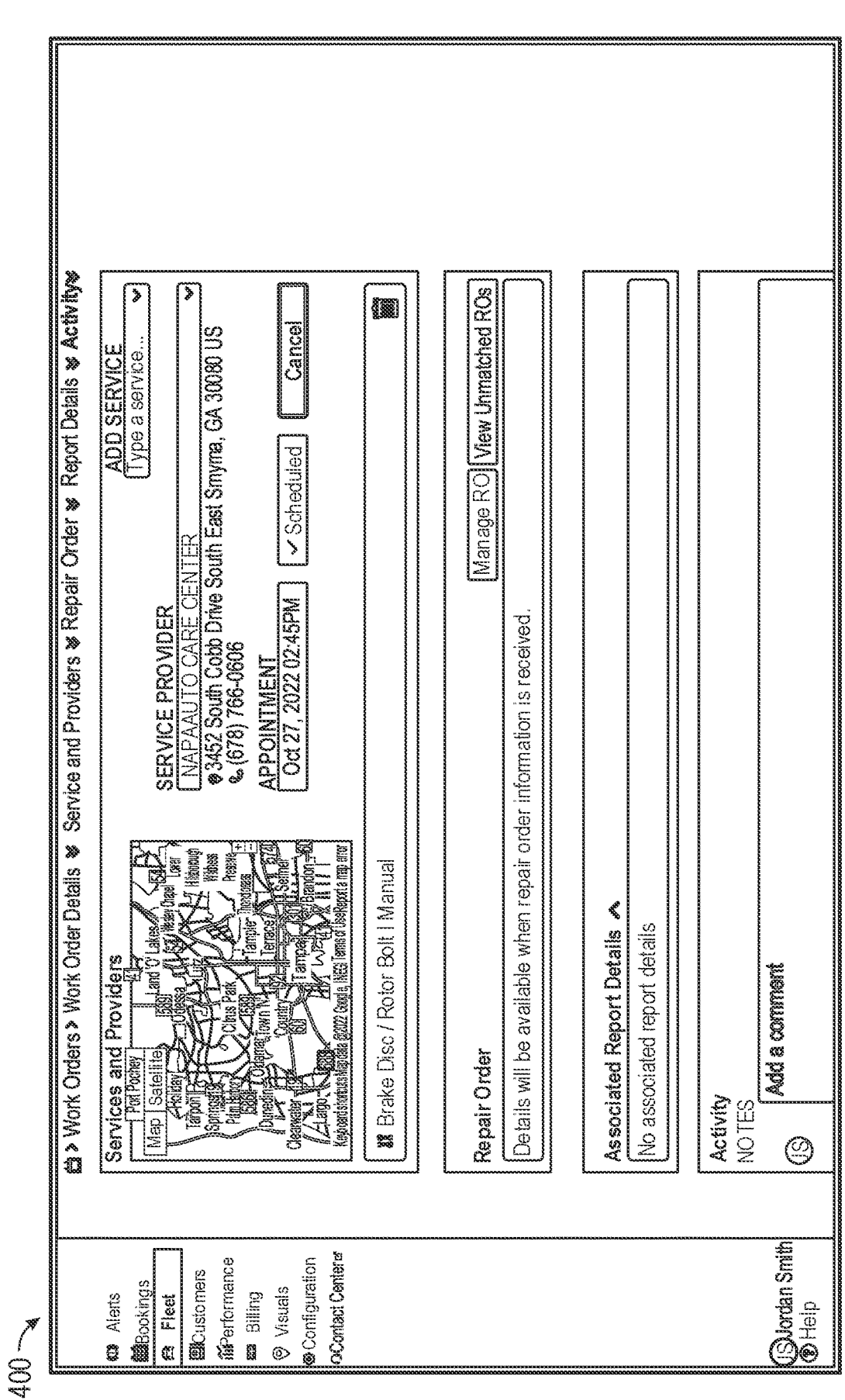
FIG. 7 illustrates another example user interfaces, in accordance with one or more example embodiments of the disclosure.
Figure 8:
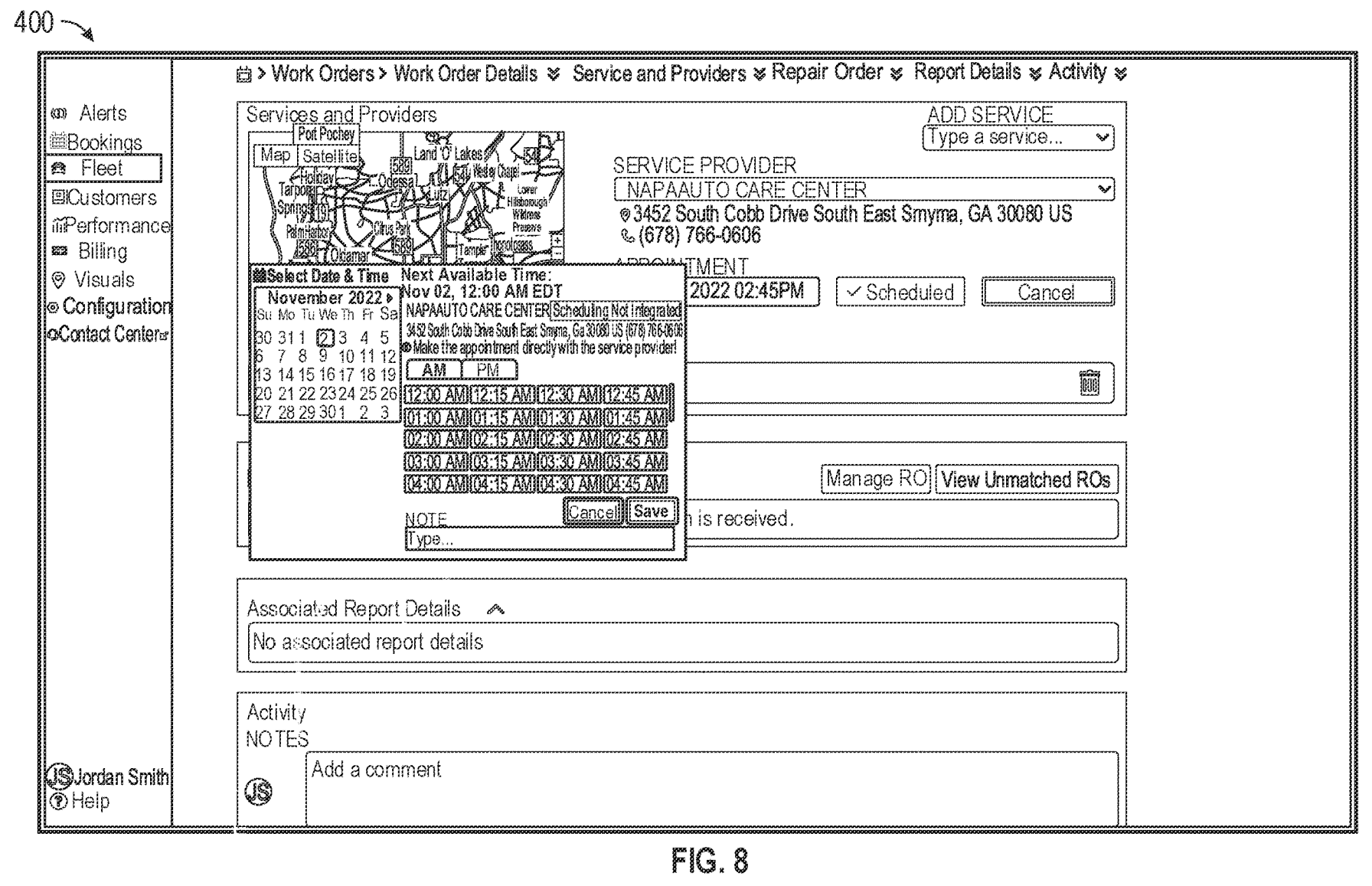
Figure 9A:
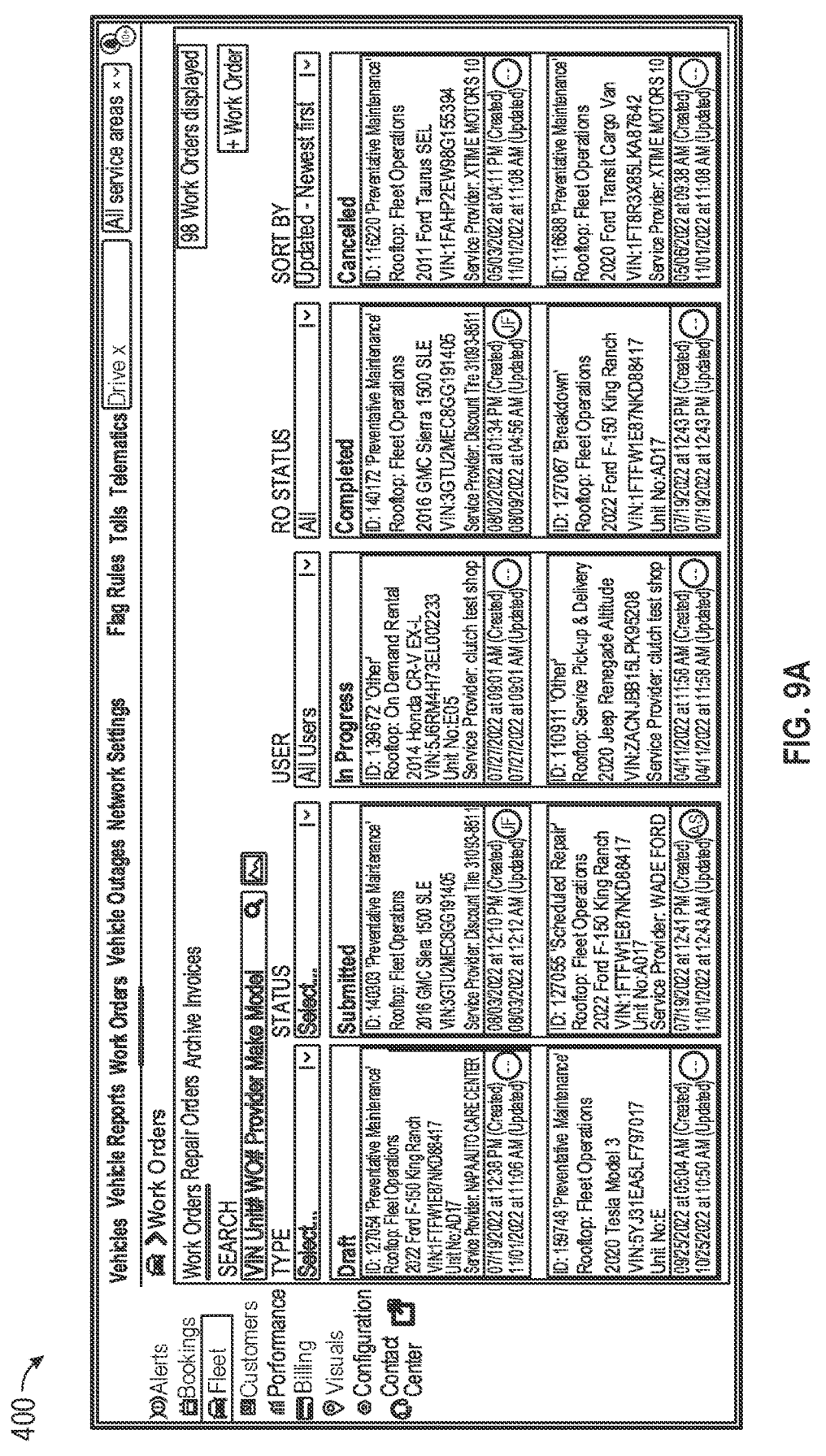

FIGS. 6-8 illustrate portions of the user interface that may allow a user to submit a work order and schedule an action (e.g., a vehicle repair) to resolve a vehicle fault with a vehicle. FIG. 6 shows an example work order in which a user may manually input information about the vehicle to submit the work order. FIG. 7 shows example information about service providers that may be provided to a user. FIG. 8 shows an example scheduling calendar that allows a user to select an available time and day for the service facility to perform the service. Data may be obtained from the service provider indicating scheduling availability such that the calendar may be synchronized with the schedule of a specific service facility. FIG. 9A shows a listing.

Although FIGS. 6-8 show example portions of the user interface 400 that allow the user to manually create a work order and select a service facility, this is not intended to be limiting. As described elsewhere herein, this process may also automatically be managed by the system rather than requiring the user to manually perform the process.

Figure 9B:
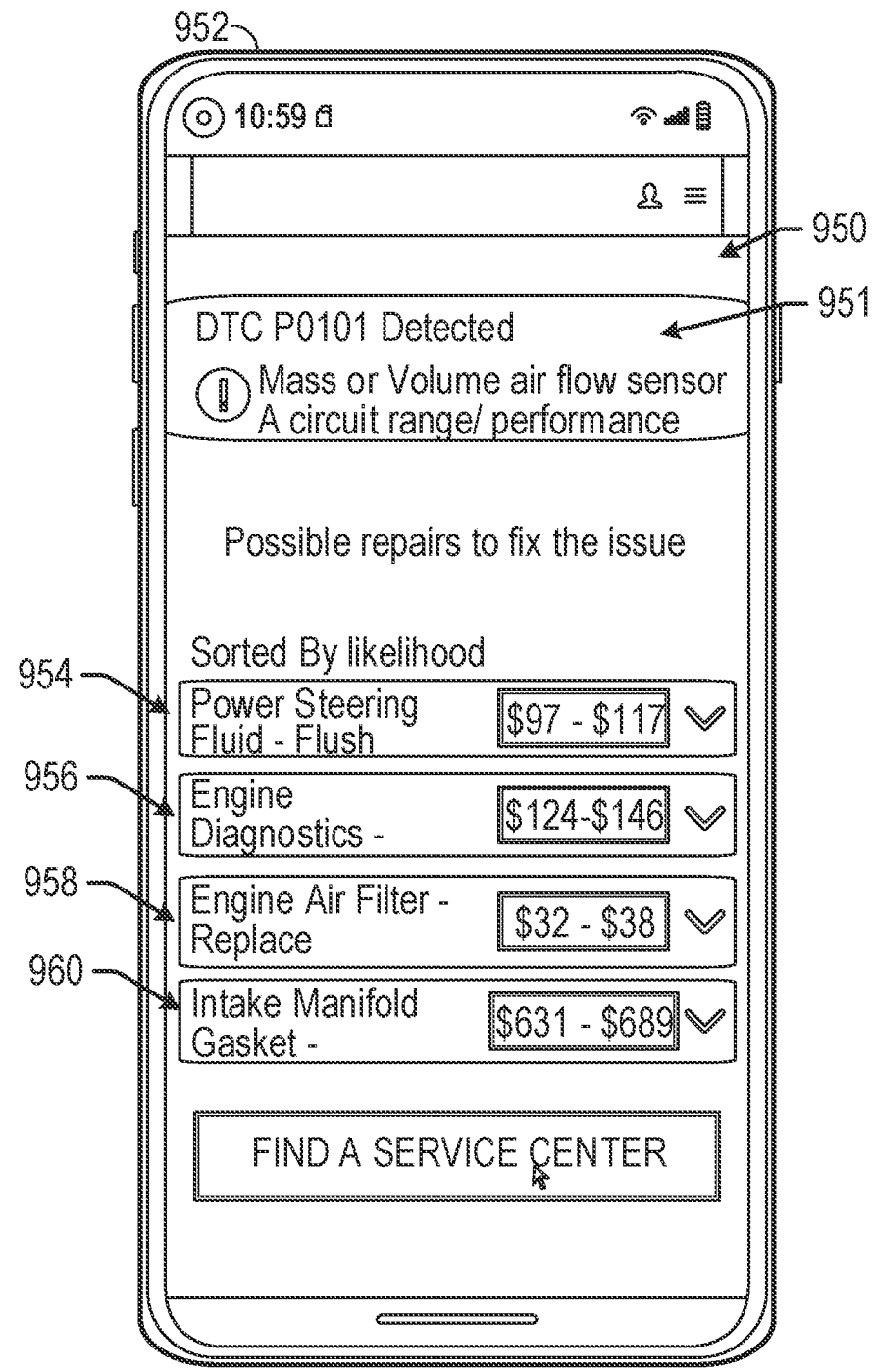
FIG. 9B illustrates another example user interface, in accordance with one or more example embodiments of the disclosure.

FIG. 9B illustrates another example user interface 950 (for example, display on a device 952, which may be the same as user device 1112 and/or any other device), in accordance with one or more example embodiments of the disclosure. The user interface 950 may be associated with an application, for example, such as application 1110.

Particularly, the user interface 950 illustrates that multiple different types of potential actions may be presented to a user and the actions may be sorted by probability of resolving the vehicle fault (for example, the DTC code 951 shown in the user interface 952). For example, the user interface 950 shows a first action 954, a second action 956, a third action 958, and a fourth action 960. The first action 954 may have the highest probability of resolving the vehicle fault, followed by the second action 956, the third action 958, and the fourth action 960. Additional information may also be provided for each action, such as the estimated price range for completing the action and/or any other relevant information not shown in the user interface 950 as well.

The user interface 950 may also provide any other functionality, such as allowing a user to select a particular action (such as the first action 954, for example) to view additional information about the action. For example, the additional information may include the specific probability value and/or any other relevant information. The user interface 950 may also allow the user to sort the actions based on any other criteria, such as price, service location availability, etc.

Figure 10:
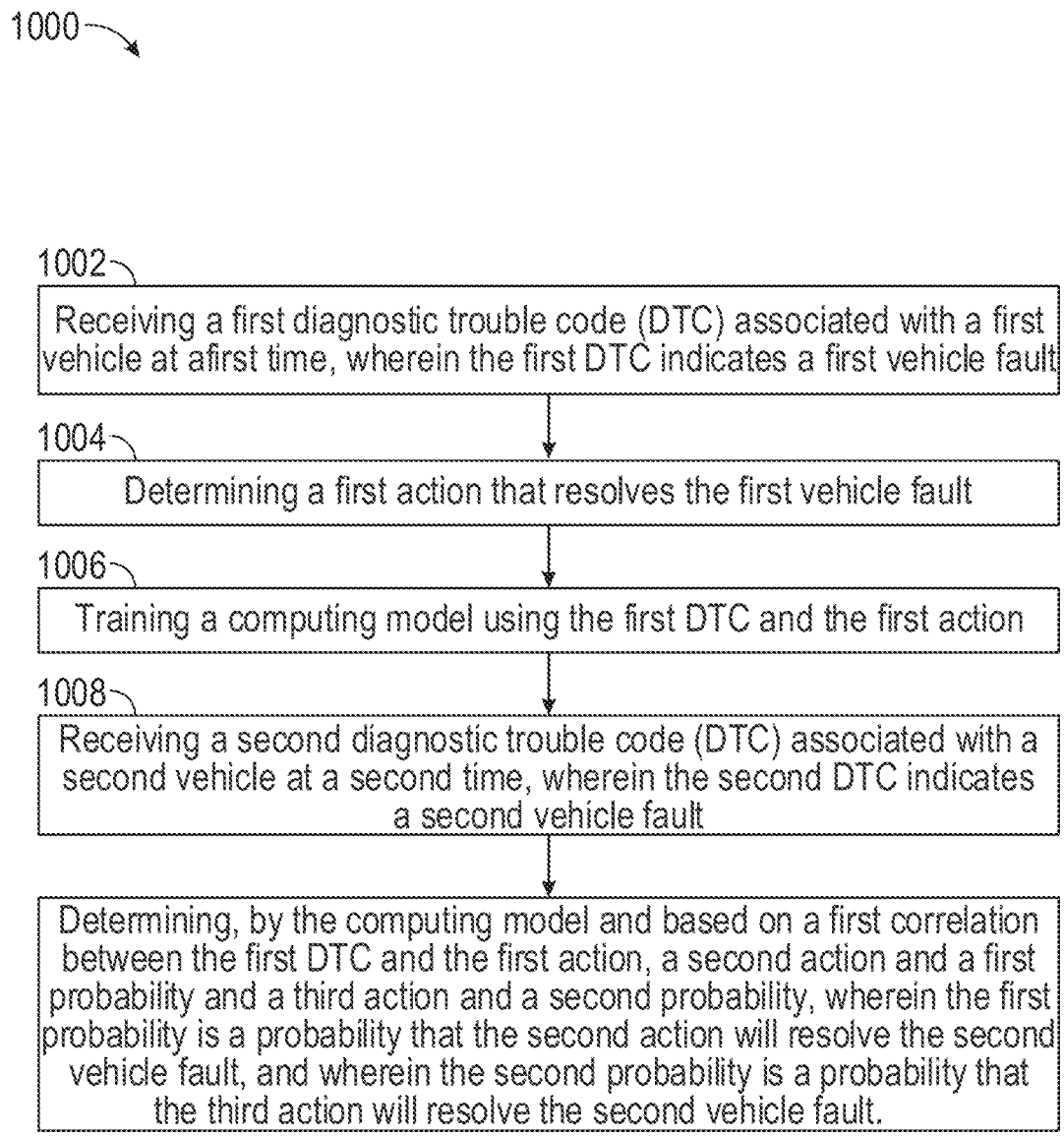
FIG. 10 is an example method, in accordance with one or more example embodiments of the disclosure.

FIG. 10 is an example method 1000, in accordance with one or more example embodiments of the disclosure. The method 1000 may be implemented by any device or system described herein (for example server 1120, vehicle 1140, computing device 1200, etc.).

At block 1002 of the method 1000, computer-executable instructions stored on a memory of the device or system, may be executed to receive a first diagnostic trouble code (DTC) associated with a first vehicle at a first time, wherein the first DTC indicates a first vehicle fault.

At block 1004 of the method 1000, computer-executable instructions stored on a memory of the device or system, may be executed to determine a first action that resolves the first vehicle fault.

At block 1006 of the method 1000, computer-executable instructions stored on a memory of the device or system, may be executed to train a computing model using the first DTC and the first action.

At block 1008 of the method 1000, computer-executable instructions stored on a memory of the device or system, may be executed to receive a second diagnostic trouble code (DTC) associated with a second vehicle at a second time, wherein the second DTC indicates a second vehicle fault. determining, by the computing model and based on a first correlation between the first DTC and the first action, a second action and a first probability and a third action and a second probability, wherein the first probability is a probability that the second action will resolve the second vehicle fault, and wherein the second probability is a probability that the third action will resolve the second vehicle fault.

Figure 11:
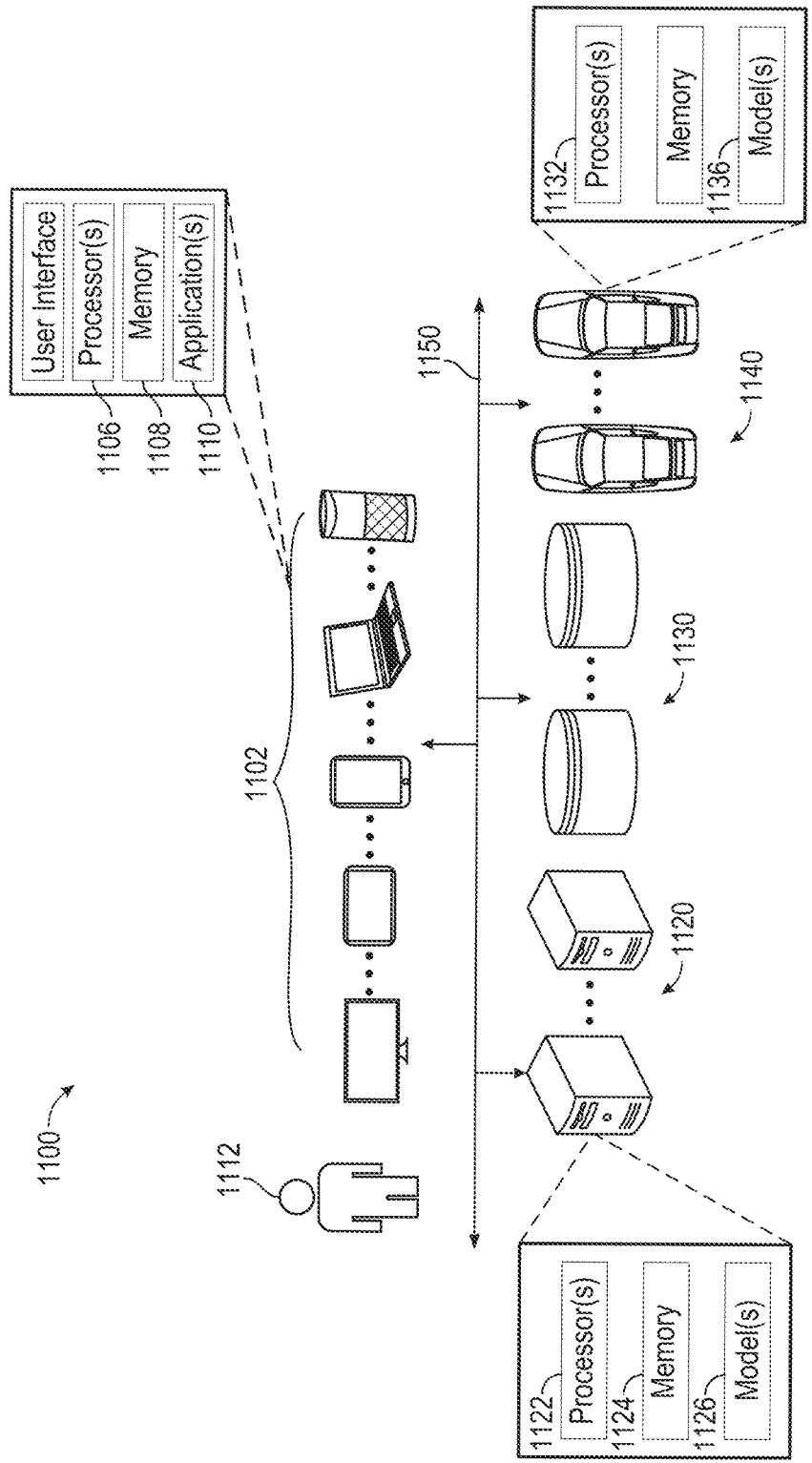
FIG. 11 is an example system, in accordance with one or more example embodiments of the disclosure.

FIG. 11 is a schematic illustration of an example system 1100 in accordance with one or more example embodiments of the disclosure. In one or more embodiments, the system 1100 may include at least one or more user devices 1102, one or more servers 1120, one or more databases 1130, and/or one or more vehicles 1140. However, these components of the system 1100 are merely exemplary and are not intended to be limiting in any way. For simplicity, reference may be made hereinafter to a "user device 1102," a "server 1120," a "database 1130," and "a vehicle 1140," however, this is not intended to be limiting and may still refer to any number of such elements.

The user device 1102 may be any type of device that is used by a user 1112 while browsing for products. For example, the user device 1102 may include a desktop or laptop computer, tablet, smartphone, and/or any other type of device. The user device 1102 may also include one or more processors 1106 and memory 1108. The user device 1102 may also include an application 1110 that may allow the user 1112 to access a mobile application to view information about a vehicle, any actions, probabilities, and/or other information produced by the model described herein, and/or perform any other functionality described herein. For example, the user may be able to view (and interact with) the user interface 400 through the mobile device 1102.

The server 1120 may be a local or remote system that is used to perform any of the processing described herein (for example, server 1120 may host any of the model(s) described herein and/or may perform any of the operations described herein relating to predicting conversions, generating aggregated reports, and/or performing any other processes described herein or otherwise). The server 1120 may also include one or more processors 1122 and memory 1124. Any of the processes may be facilitated by one or more module(s) 1126. Any of these functions performed by the server 1120 may also be performed by any other element of the system 1100 as well (for example, the user device 1102, vehicle 1140, etc.).

The database 1130 may include any storage medium that may be used to store any of the date described herein or otherwise. For example, the database 1130 may store input data relating to user search queries, past search queries, product reviews, and/or any other input data. The database 1130 may also store any of the icons that are used to produce the dynamic product summary image. The database 1130 may also store pre-generated dynamic product summary images to reduce the amount of processing time required to present dynamic product summary images that were previously presented.

The vehicle 1140 may include any type of vehicle (for example, electric vehicle, hybrid vehicle, internal combustion engine vehicle, autonomous or semiautonomous vehicle, etc.). The vehicle 1140 may be configured to capture information about various vehicle sub-systems and transmit the information to a remote system, such as server 1120, database 1130, etc. The vehicle 1140 may also include one or more processors 1132 and memory 1136. In one or more embodiments, the model 1126 may be stored on the vehicle 1140 instead of the server 1120. In this manner, the vehicle 1140 may be configured to diagnose its own vehicle faults (for example any DTCs that are produced and or any other indications of faults identified by the vehicle 1140). The vehicle 1140 may also be configured to automatically resolve the vehicle faults as well. For example, the vehicle 1140 may be an autonomous vehicle that may be configured to schedule a service request with a service facility and automatically navigate to the service facility to receive the service.

In one or more embodiments, any of the elements of the system 1100 (for example, the user device 1102, the server 1120, the database 1130, the vehicle 1140, and/or any other element described with respect to FIG. 11 or otherwise) may be configured to communicate via a communications network 1150. Examples of communication networks are further described with respect to FIG. 12. Finally, any of the elements of the system 1100 may include any of the elements of the computing device 1200 as well.

Although specific embodiments of the disclosure have been described, one of ordinary skill in the art will recognize that numerous other modifications and alternative embodiments are within the scope of the disclosure. For example, any of the functionality and/or processing capabilities described with respect to a particular device or component may be performed by any other device or component. Further, while various illustrative implementations and architectures have been described in accordance with embodiments of the disclosure, one of ordinary skill in the art will appreciate that numerous other modifications to the illustrative implementations and architectures described herein are also within the scope of this disclosure.

Certain aspects of the disclosure are described above with reference to block and flow diagrams of systems, methods, apparatuses, and/or computer program products according to example embodiments. It will be understood that one or more blocks of the block diagrams and flow diagrams, and combinations of blocks in the block diagrams and the flow diagrams, respectively, may be implemented by execution of computer-executable program instructions. Likewise, some blocks of the block diagrams and flow diagrams may not necessarily need to be performed in the order presented, or may not necessarily need to be performed at all, according to one or more embodiments. Further, additional components and/or operations beyond those depicted in blocks of the block and/or flow diagrams may be present in certain embodiments.

Accordingly, blocks of the block diagrams and flow diagrams support combinations of means for performing the specified functions, combinations of elements or steps for performing the specified functions, and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Figure 12:
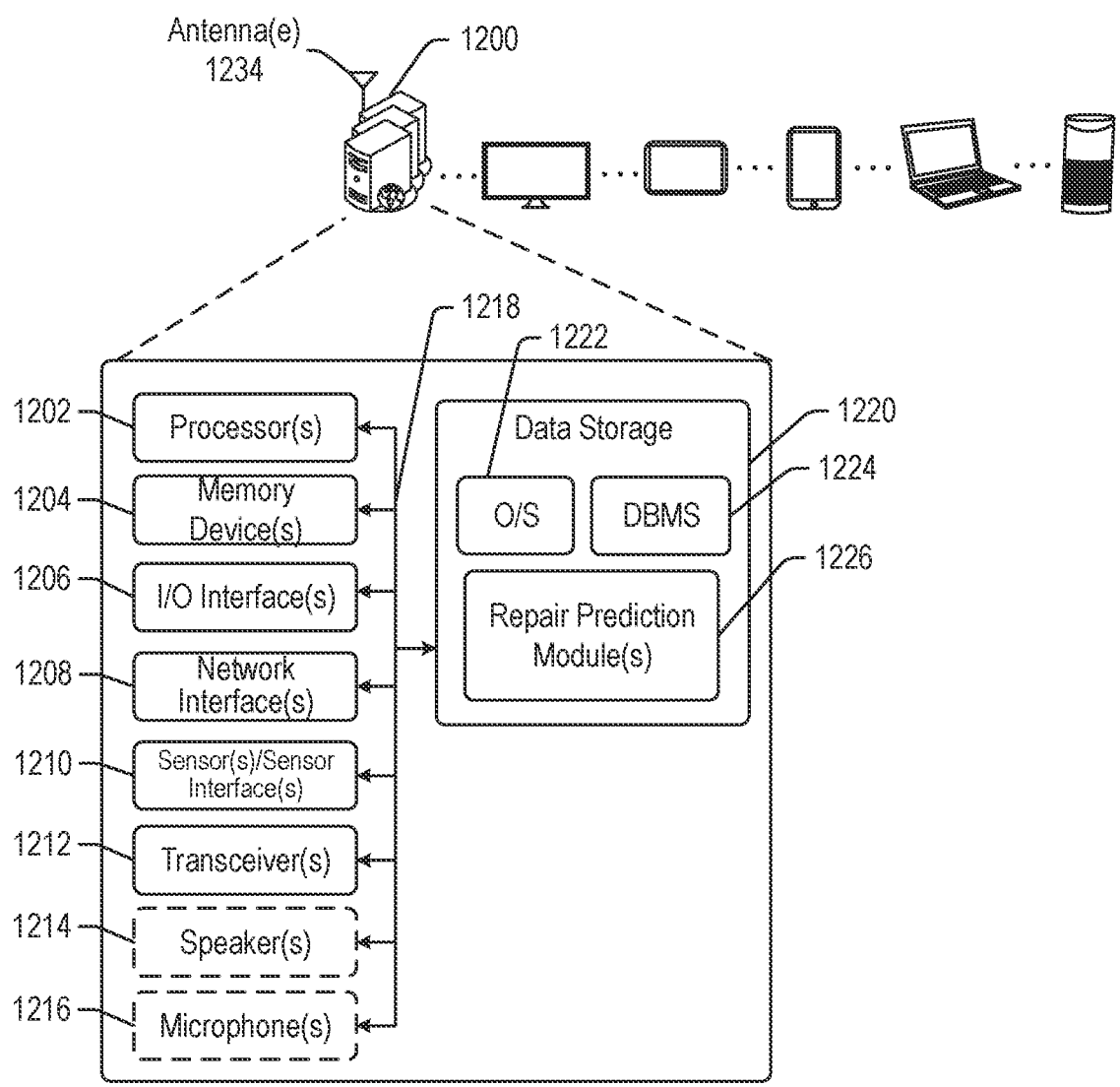
FIG. 12 is a schematic block diagram of an illustrative device, in accordance with one or more example embodiments of the disclosure.

FIG. 12 is a schematic block diagram of an illustrative computing device 1200 in accordance with one or more example embodiments of the disclosure. The computing device 1200 may include any suitable computing device capable of receiving and/or generating data including, but not limited to, a mobile device such as a smartphone, tablet, e-reader, wearable device, or the like; a desktop computer; a laptop computer; a content streaming device; a set-top box; or the like. The computing device 1200 may correspond to an illustrative device configuration for the devices of FIGS. 1-11.

The computing device 1200 may be configured to communicate via one or more networks with one or more servers, search engines, user devices, or the like. In one or more embodiments, a single remote server or single group of remote servers may be configured to perform more than one type of content rating and/or machine learning functionality.

Example network(s) may include, but are not limited to, any one or more different types of communications networks such as, for example, cable networks, public networks (e.g., the Internet), private networks (e.g., frame-relay networks), wireless networks, cellular networks, telephone networks (e.g., a public switched telephone network), or any other suitable private or public packet-switched or circuit-switched networks. Further, such network(s) may have any suitable communication range associated therewith and may include, for example, global networks (e.g., the Internet), metropolitan area networks (MANs), wide area networks (WANs), local area networks (LANs), or personal area networks (PANs). In addition, such network(s) may include communication links and associated networking devices (e.g., link-layer switches, routers, etc.) for transmitting network traffic over any suitable type of medium including, but not limited to, coaxial cable, twisted-pair wire (e.g., twisted-pair copper wire), optical fiber, a hybrid fiber-coaxial (HFC) medium, a microwave medium, a radio frequency communication medium, a satellite communication medium, or any combination thereof.

In an illustrative configuration, the computing device 1200 may include one or more processors (processor(s)) 1202, one or more memory devices 1204 (generically referred to herein as memory 1204), one or more input/output (I/O) interface(s) 1206, one or more network interface(s) 1208, one or more sensors or sensor interface(s) 1210, one or more transceivers 1212, one or more optional speakers 1214, one or more optional microphones 1216, and data storage 1220. The computing device 1200 may further include one or more buses 1218 that functionally couple various components of the computing device 1200. The computing device 1200 may further include one or more antenna(e) 1234 that may include, without limitation, a cellular antenna for transmitting or receiving signals to/from a cellular network infrastructure, an antenna for transmitting or receiving Wi-Fi signals to/from an access point (AP), a Global Navigation Satellite System (GNSS) antenna for receiving GNSS signals from a GNSS satellite, a Bluetooth antenna for transmitting or receiving Bluetooth signals, a Near Field Communication (NFC) antenna for transmitting or receiving NFC signals, and so forth. These various components will be described in more detail hereinafter.

The bus(es) 1218 may include at least one of a system bus, a memory bus, an address bus, or a message bus, and may permit exchange of information (e.g., data (including computer-executable code), signaling, etc.) between various components of the computing device 1200. The bus(es) 1218 may include, without limitation, a memory bus or a memory controller, a peripheral bus, an accelerated graphics port, and so forth. The bus(es) 1218 may be associated with any suitable bus architecture including, without limitation, an Industry Standard Architecture (ISA), a Micro Channel Architecture (MCA), an Enhanced ISA (EISA), a Video Electronics Standards Association (VESA) architecture, an Accelerated Graphics Port (AGP) architecture, a Peripheral Component Interconnects (PCI) architecture, a PCI-Express architecture, a Personal Computer Memory Card International Association (PCMCIA) architecture, a Universal Serial Bus (USB) architecture, and so forth.

The memory 1204 of the computing device 1200 may include volatile memory (memory that maintains its state when supplied with power) such as random-access memory (RAM) and/or nonvolatile memory (memory that maintains its state even when not supplied with power) such as read-only memory (ROM), flash memory, ferroelectric RAM (FRAM), and so forth. Persistent data storage, as that term is used herein, may include nonvolatile memory. In certain example embodiments, volatile memory may enable faster read/write access than nonvolatile memory. However, in certain other example embodiments, certain types of nonvolatile memory (e.g., FRAM) may enable faster read/write access than certain types of volatile memory.

In various implementations, the memory 1204 may include multiple different types of memory such as various types of static random-access memory (SRAM), various types of dynamic random-access memory (DRAM), various types of unalterable ROM, and/or writeable variants of ROM such as electrically erasable programmable read-only memory (EEPROM), flash memory, and so forth. The memory 1204 may include main memory as well as various forms of cache memory such as instruction cache(s), data cache(s), translation lookaside buffer(s) (TLBs), and so forth. Further, cache memory such as a data cache may be a multilevel cache organized as a hierarchy of one or more cache levels (L1, L2, etc.).

The data storage 1220 may include removable storage and/or nonremovable storage including, but not limited to, magnetic storage, optical disk storage, and/or tape storage. The data storage 1220 may provide nonvolatile storage of computer-executable instructions and other data. The memory 1204 and the data storage 1220, removable and/or nonremovable, are examples of computer-readable storage media (CRSM) as that term is used herein.

The data storage 1220 may store computer-executable code, instructions, or the like that may be loadable into the memory 1204 and executable by the processor(s) 1202 to cause the processor(s) 1202 to perform or initiate various operations. The data storage 1220 may additionally store data that may be copied to memory 1204 for use by the processor(s) 1202 during the execution of the computer-executable instructions. Moreover, output data generated as a result of execution of the computer-executable instructions by the processor(s) 1202 may be stored initially in memory 1204, and may ultimately be copied to data storage 1220 for nonvolatile storage.

More specifically, the data storage 1220 may store one or more operating systems (O/S) 1222; one or more database management systems (DBMS) 1224; and one or more program module(s), applications, engines, computer-executable code, scripts, or the like such as, for example, one or more repair prediction module(s) 1226. Some or all these module(s) may be sub-module(s). Any of the components depicted as being stored in data storage 1220 may include any combination of software, firmware, and/or hardware. The software and/or firmware may include computer-executable code, instructions, or the like that may be loaded into the memory 1204 for execution by one or more of the processor(s) 1202. Any of the components depicted as being stored in data storage 1220 may support functionality described in reference to correspondingly named components earlier in this disclosure.

The data storage 1220 may further store various types of data utilized by components of the computing device 1200. Any data stored in the data storage 1220 may be loaded into the memory 1204 for use by the processor(s) 1202 in executing computer-executable code. In addition, any data depicted as being stored in the data storage 1220 may potentially be stored in one or more datastore(s) and may be accessed via the DBMS 1224 and loaded in the memory 1204 for use by the processor(s) 1202 in executing computer-executable code. The datastore(s) may include, but are not limited to, databases (e.g., relational, object-oriented, etc.), file systems, flat files, distributed datastores in which data is stored on more than one node of a computer network, peer-to-peer network datastores, or the like. In FIG. 12, the datastore(s) may include, for example, purchase history information, user action information, user profile information, a database linking search queries and user actions, and other information.

The processor(s) 1202 may be configured to access the memory 1204 and execute computer-executable instructions loaded therein. For example, the processor(s) 1202 may be configured to execute computer-executable instructions of the various program module(s), applications, engines, or the like of the computing device 1200 to cause or facilitate various operations to be performed in accordance with one or more embodiments of the disclosure. The processor(s) 1202 may include any suitable processing unit capable of accepting data as input, processing the input data in accordance with stored computer-executable instructions, and generating output data. The processor(s) 1202 may include any type of suitable processing unit including, but not limited to, a central processing unit, a microprocessor, a Reduced Instruction Set Computer (RISC) microprocessor, a Complex Instruction Set Computer (CISC) microprocessor, a microcontroller, an Application Specific Integrated Circuit (ASIC), a Field-Programmable Gate Array (FPGA), a System-on-a-Chip (SoC), a digital signal processor (DSP), and so forth. Further, the processor(s) 1202 may have any suitable microarchitecture design that includes any number of constituent components such as, for example, registers, multiplexers, arithmetic logic units, cache controllers for controlling read/write operations to cache memory, branch predictors, or the like. The microarchitecture design of the processor(s) 1202 may be capable of supporting any of a variety of instruction sets.

Referring now to functionality supported by the various program module(s) depicted in FIG. 12, the repair prediction module(s) 1226 may include computer-executable instructions, code, or the like that responsive to execution by one or more of the processor(s) 1202 may perform functions including, but not limited to, performing any functionality associated with the dynamic product summary images as described herein, and the like (for example, receiving input data, identifying attributes, ranking attributes, generating icons, presenting the dynamic product summary image, and/or any other functionality).

Referring now to other illustrative components depicted as being stored in the data storage 1220, the O/S 1222 may be loaded from the data storage 1220 into the memory 1204 and may provide an interface between other application software executing on the computing device 1200 and hardware resources of the computing device 1200. More specifically, the O/S 1222 may include a set of computer-executable instructions for managing hardware resources of the computing device 1200 and for providing common services to other application programs (e.g., managing memory allocation among various application programs). In certain example embodiments, the O/S 1222 may control execution of the other program module(s) to dynamically enhance characters for content rendering. The O/S 1222 may include any operating system now known or which may be developed in the future including, but not limited to, any server operating system, any mainframe operating system, or any other proprietary or non-proprietary operating system.

The DBMS 1224 may be loaded into the memory 1204 and may support functionality for accessing, retrieving, storing, and/or manipulating data stored in the memory 1204 and/or data stored in the data storage 1220. The DBMS 1224 may use any of a variety of database models (e.g., relational model, object model, etc.) and may support any of a variety of query languages. The DBMS 1224 may access data represented in one or more data schemas and stored in any suitable data repository including, but not limited to, databases (e.g., relational, object-oriented, etc.), file systems, flat files, distributed datastores in which data is stored on more than one node of a computer network, peer-to-peer network datastores, or the like. In those example embodiments in which the computing device 1200 is a mobile device, the DBMS 1224 may be any suitable light-weight DBMS optimized for performance on a mobile device.

Referring now to other illustrative components of the computing device 1200, the input/output (I/O) interface(s) 1206 may facilitate the receipt of input information by the computing device 1200 from one or more I/O devices as well as the output of information from the computing device 1200 to the one or more I/O devices. The I/O devices may include any of a variety of components such as a display or display screen having a touch surface or touchscreen; an audio output device for producing sound, such as a speaker; an audio capture device, such as a microphone; an image and/or video capture device, such as a camera; a haptic unit; and so forth. Any of these components may be integrated into the computing device 1200 or may be separate. The I/O devices may further include, for example, any number of peripheral devices such as data storage devices, printing devices, and so forth.

The I/O interface(s) 1206 may also include an interface for an external peripheral device connection such as universal serial bus (USB), FireWire, Thunderbolt, Ethernet port or other connection protocol that may connect to one or more networks. The I/O interface(s) 1206 may also include a connection to one or more of the antenna(e) 1234 to connect to one or more networks via a wireless local area network (WLAN) (such as Wi-Fi) radio, Bluetooth, ZigBee, and/or a wireless network radio, such as a radio capable of communication with a wireless communication network such as a Long Term Evolution (LTE) network, WiMAX network, 3G network, ZigBee network, etc.

The computing device 1200 may further include one or more network interface(s) 1208 via which the computing device 1200 may communicate with any of a variety of other systems, platforms, networks, devices, and so forth. The network interface(s) 1208 may enable communication, for example, with one or more wireless routers, one or more host servers, one or more web servers, and the like via one or more of networks.

The antenna(e) 1234 may include any suitable type of antenna depending, for example, on the communications protocols used to transmit or receive signals via the antenna (e) 1234. Non-limiting examples of suitable antennas may include directional antennas, non-directional antennas, dipole antennas, folded dipole antennas, patch antennas, multiple-input multiple-output (MIMO) antennas, or the like. The antenna(e) 1234 may be communicatively coupled to one or more transceivers 1212 or radio components to which or from which signals may be transmitted or received.

As previously described, the antenna(e) 1234 may include a cellular antenna configured to transmit or receive signals in accordance with established standards and protocols, such as Global System for Mobile Communications (GSM), 3G standards (e.g., Universal Mobile Telecommunications System (UMTS), Wideband Code Division Multiple Access (W-CDMA), CDMA2000, etc.), 4G standards (e.g., Long-Term Evolution (LTE), WiMax, etc.), direct satellite communications, or the like.

The antenna(e) 1234 may additionally, or alternatively, include a Wi-Fi antenna configured to transmit or receive signals in accordance with established standards and protocols, such as the IEEE 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antenna(e) 1234 may be configured to transmit or receive radio frequency signals within any suitable frequency range forming part of the unlicensed portion of the radio spectrum.

The antenna(e) 1234 may additionally, or alternatively, include a GNSS antenna configured to receive GNSS signals from three or more GNSS satellites carrying time-position information to triangulate a position therefrom. Such a GNSS antenna may be configured to receive GNSS signals from any current or planned GNSS such as, for example, the Global Positioning System (GPS), the GLONASS System, the Compass Navigation System, the Galileo System, or the Indian Regional Navigational System.

The transceiver(s) 1212 may include any suitable radio component(s) for—in cooperation with the antenna(e) 1234—transmitting or receiving radio frequency (RF) signals in the bandwidth and/or channels corresponding to the communications protocols utilized by the computing device 1200 to communicate with other devices. The transceiver(s) 1212 may include hardware, software, and/or firmware for modulating, transmitting, or receiving—potentially in cooperation with any of antenna(e) 1234—communications signals according to any of the communications protocols discussed above including, but not limited to, one or more Wi-Fi and/or Wi-Fi direct protocols, as standardized by the IEEE 802.11 standards, one or more non-Wi-Fi protocols, or one or more cellular communications protocols or standards. The transceiver(s) 1212 may further include hardware, firmware, or software for receiving GNSS signals. The transceiver(s) 1212 may include any known receiver and baseband suitable for communicating via the communications protocols utilized by the computing device 1200. The transceiver(s) 1212 may further include a low noise amplifier (LNA), additional signal amplifiers, an analog-to-digital (A/D) converter, one or more buffers, a digital baseband, or the like.

The sensor(s)/sensor interface(s) 1210 may include or may be capable of interfacing with any suitable type of sensing device such as, for example, inertial sensors, force sensors, thermal sensors, and so forth. Example types of inertial sensors may include accelerometers (e.g., MEMS-based accelerometers), gyroscopes, and so forth.

The optional speaker(s) 1214 may be any device configured to generate audible sound. The optional microphone(s) 1216 may be any device configured to receive analog sound input or voice data.

It should be appreciated that the program module(s), applications, computer-executable instructions, code, or the like depicted in FIG. 12 as being stored in the data storage 1220 are merely illustrative and not exhaustive and that processing described as being supported by any particular module may alternatively be distributed across multiple module(s) or performed by a different module. In addition, various program module(s), script(s), plug-in(s), Application Programming Interface(s) (API(s)), or any other suitable computer-executable code hosted locally on the computing device 1200, and/or hosted on other computing device(s) accessible via one or more networks, may be provided to support functionality provided by the program module(s), applications, or computer-executable code depicted in FIG. 12 and/or additional or alternate functionality. Further, functionality may be modularized differently such that processing described as being supported collectively by the collection of program module(s) depicted in FIG. 12 may be performed by a fewer or greater number of module(s), or functionality described as being supported by any particular module may be supported, at least in part, by another module. In addition, program module(s) that support the functionality described herein may form part of one or more applications executable across any number of systems or devices in accordance with any suitable computing model such as, for example, a client-server model, a peer-to-peer model, and so forth. In addition, any of the functionality described as being supported by any of the program module (s) depicted in FIG. 12 may be implemented, at least partially, in hardware and/or firmware across any number of devices.

It should further be appreciated that the computing device 1200 may include alternate and/or additional hardware, software, or firmware components beyond those described or depicted without departing from the scope of the disclosure. More particularly, it should be appreciated that software, firmware, or hardware components depicted as forming part of the computing device 1200 are merely illustrative and that some components may not be present or additional components may be provided in various embodiments. While various illustrative program module(s) have been depicted and described as software module(s) stored in data storage 1220, it should be appreciated that functionality described as being supported by the program module(s) may be enabled by any combination of hardware, software, and/or firmware. It should further be appreciated that each of the above-mentioned module(s) may, in various embodiments, represent a logical partitioning of supported functionality. This logical partitioning is depicted for ease of explanation of the functionality and may not be representative of the structure of software, hardware, and/or firmware for implementing the functionality. Accordingly, it should be appreciated that functionality described as being provided by a particular module may, in various embodiments, be provided at least in part by one or more other module(s). Further, one or more depicted module(s) may not be present in certain embodiments, while in other embodiments, additional module(s) not depicted may be present and may support at least a portion of the described functionality and/or additional functionality. Moreover, while certain module(s) may be depicted and described as sub-module(s) of another module, in certain embodiments, such module(s) may be provided as independent module(s) or as sub-module (s) of other module(s).

Program module(s), applications, or the like disclosed herein may include one or more software components including, for example, software objects, methods, data structures, or the like. Each such software component may include computer-executable instructions that, responsive to execution, cause at least a portion of the functionality described herein (e.g., one or more operations of the illustrative methods described herein) to be performed.

A software component may be coded in any of a variety of programming languages. An illustrative programming language may be a lower-level programming language such as an assembly language associated with a particular hardware architecture and/or operating system platform. A software component comprising assembly language instructions may require conversion into executable machine code by an assembler prior to execution by the hardware architecture and/or platform.

Another example programming language may be a higher-level programming language that may be portable across multiple architectures. A software component comprising higher-level programming language instructions may require conversion to an intermediate representation by an interpreter or a compiler prior to execution.

Other examples of programming languages include, but are not limited to, a macro language, a shell or command language, a job control language, a script language, a database query or search language, or a report writing language. In one or more example embodiments, a software component comprising instructions in one of the foregoing examples of programming languages may be executed directly by an operating system or other software component without having to be first transformed into another form.

A software component may be stored as a file or other data storage construct. Software components of a similar type or functionally related may be stored together such as, for example, in a particular directory, folder, or library. Software components may be static (e.g., pre-established or fixed) or dynamic (e.g., created or modified at the time of execution).

Software components may invoke or be invoked by other software components through any of a wide variety of mechanisms. Invoked or invoking software components may comprise other custom-developed application software, operating system functionality (e.g., device drivers, data storage (e.g., file management) routines, other common routines and services, etc.), or third-party software components (e.g., middleware, encryption, or other security software, database management software, file transfer or other network communication software, mathematical or statistical software, image processing software, and format translation software).

Software components associated with a particular solution or system may reside and be executed on a single platform or may be distributed across multiple platforms. The multiple platforms may be associated with more than one hardware vendor, underlying chip technology, or operating system. Furthermore, software components associated with a particular solution or system may be initially written in one or more programming languages, but may invoke software components written in another programming language.

Computer-executable program instructions may be loaded onto a special-purpose computer or other particular machine, a processor, or other programmable data processing apparatus to produce a particular machine, such that execution of the instructions on the computer, processor, or other programmable data processing apparatus causes one or more functions or operations specified in the flow diagrams to be performed. These computer program instructions may also be stored in a computer-readable storage medium (CRSM) that upon execution may direct a computer or other programmable data processing apparatus to function in a particular manner, such that the instructions stored in the computer-readable storage medium produce an article of manufacture including instruction means that implement one or more functions or operations specified in the flow diagrams. The computer program instructions may also be loaded onto a computer or other programmable data processing apparatus to cause a series of operational elements or steps to be performed on the computer or other programmable apparatus to produce a computer-implemented process.

Additional types of CRSM that may be present in any of the devices described herein may include, but are not limited to, programmable random-access memory (PRAM), SRAM, DRAM, RAM, ROM, electrically erasable programmable read-only memory (EEPROM), flash memory or other memory technology, compact disc read-only memory (CD-ROM), digital versatile disc (DVD) or other optical storage, magnetic cassettes, magnetic tape, magnetic disk storage or other magnetic storage devices, or any other medium which can be used to store the information and which can be accessed. Combinations of any of the above are also included within the scope of CRSM. Alternatively, computer-readable communication media (CRCM) may include computer-readable instructions, program module(s), or other data transmitted within a data signal, such as a carrier wave, or other transmission. However, as used herein, CRSM does not include CRCM.

Although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without user input or prompting, whether these features, elements, and/or steps are included or are to be performed in any particular embodiment.

That which is claimed is:

1. A system comprising:
    memory that stores computer-executable instructions; and
    one or more processors configured to access the memory and execute the computer-executable instructions to:
        receive a first diagnostic trouble code (DTC) associated with a first vehicle of a first vehicle type at a first time, wherein the first DTC indicates a first vehicle fault;
        receive a second diagnostic trouble code (DTC) associated with a second vehicle of a second vehicle type at a second time, wherein the second DTC indicates a second vehicle fault, wherein the first vehicle type is different than the second vehicle type;
determine a first action that resolve d the first vehicle fault and a second action that resolved the second vehicle fault;
train a natural language processing model using the first DTC, the first action, the second DTC, and the second action;
receive a third diagnostic trouble code (DTC) associated with a third vehicle at a third time, wherein the third DTC indicates a third vehicle fault, wherein the third vehicle is the first vehicle type;
assign, by the natural language processing model, a first weighting value to the first DTC and first action and a second weighting value to the second DTC and second action based on the third vehicle being the first vehicle type; and
determine, by the natural language processing model, a third action and a first probability, and a fourth action and a second probability, wherein the first probability is a probability that the third action will resolve the third vehicle fault, and wherein the second probability is a probability that the fourth action will resolve the second vehicle fault.

2. The system of claim 1, wherein the one or more processors are further configured to execute the computer-executable instructions to:
receive a fourth diagnostic trouble code (DTC) associated with a fourth vehicle, wherein the fourth DTC indicates a fourth vehicle fault, wherein the fourth vehicle is a different type of vehicle than the first vehicle, wherein the first vehicle fault and fourth vehicle fault are associated with a first type of vehicle subsystem;
determine a fifth action that resolved the fourth vehicle fault; and
train the natural language processing model using the fourth DTC and the fifth action, wherein determining the second action, the third action, the first probability, and the second probability is also based on the fourth DTC and the fifth action, and wherein the natural language processing model associates, based on a determination that the first vehicle and fourth vehicle include a same type of component in the first type of vehicle subsystem, a third weighting value with the fourth DTC and fifth action that is greater than the second weighting value.

3. The system of claim 1, wherein the one or more processors are further configured to execute the computer-executable instructions to:
determine a service facility to perform the first action or the second action; and
automatically schedule a service with the service facility.

4. The system of claim 1, wherein the one or more processors are further configured to execute the computer-executable instructions to:
display an indication of the second action, the third action, the first probability, and the second probability on a user interface, wherein the first action and second action are presented in a particular order based on the first probability and the second probability.

5. The system of claim 1, wherein the first vehicle is an autonomous vehicle, and wherein the one or more processors are further configured to execute the computer-executable instructions to:
autonomously navigate the first vehicle to a service facility to perform the second action or the third action.

6. A method comprising:
receiving a first diagnostic trouble code (DTC) associated with a first vehicle of a first vehicle type at a first time, wherein the first DTC indicates a first vehicle fault;
receiving a second diagnostic trouble code (DTC) associated with a second vehicle of a second vehicle type at a second time, wherein the second DTC indicates a second vehicle fault, wherein the first vehicle type is different than the second vehicle type;
determining a first action that resolve d the first vehicle fault and a second action that resolved the second vehicle fault;
training a natural language processing model using the first DTC, the first action, the second DTC, and the second action;
receiving a third diagnostic trouble code (DTC) associated with a third vehicle at a third time, wherein the third DTC indicates a third vehicle fault, wherein the third vehicle is the first vehicle type; and
assign, by the natural language processing model, a first weighting value to the first DTC and first action and a second weighting value to the second DTC and second action based on the third vehicle being the first vehicle type; and
determining, by the natural language processing model, a third action and a first probability, and a fourth action and a second probability, wherein the first probability is a probability that the third action will resolve the third vehicle fault, and wherein the second probability is a probability that the fourth action will resolve the second vehicle fault.

7. The method of claim 6, further comprising:
receiving a fourth diagnostic trouble code (DTC) associated with a fourth vehicle, wherein the fourth DTC indicates a fourth vehicle fault, wherein the fourth vehicle is a different type of vehicle than the first vehicle, wherein the first vehicle fault and fourth vehicle fault are associated with a first type of vehicle subsystem;
determining a fifth action that resolved the fourth vehicle fault; and
training the natural language processing model using the fourth DTC and the fifth action, wherein determining the second action, the third action, the first probability, and the second probability is also based on a third correlation between the fourth DTC and the fifth action, and wherein the natural language processing model provides, based on a determination that the first vehicle and fourth vehicle include a same type of component in the first type of vehicle subsystem, a third weighting value to the third correlation that is greater than the second weighting value.

8. The method of claim 6, further comprising:
determining a service facility to perform the first action or the second action; and
automatically scheduling a service with the service facility.

9. The method of claim 6, further comprising:
displaying an indication of the second action, the third action, the first probability, and the second probability on a user interface, wherein the first action and second action are presented in a particular order based on the first probability and the second probability.

10. The method of claim 6, wherein the first vehicle is an autonomous vehicle, and wherein the method further comprises:

autonomously navigating the first vehicle to a service facility to perform the second action or the third action or automatically perform a software update for the first vehicle.

11. A non-transitory computer-readable medium storing computer-executable instructions, that when executed by one or more processors, cause the one or more processors to:
receive a first diagnostic trouble code (DTC) associated with a first vehicle of a first vehicle type at a first time, wherein the first DTC indicates a first vehicle fault;
receive a second diagnostic trouble code (DTC) associated with a second vehicle of a second vehicle type at a second time, wherein the second DTC indicates a second vehicle fault, wherein the first vehicle type is different than the second vehicle type;
determine a first action that resolve d the first vehicle fault and a second action that resolved the second vehicle fault;
train a natural language processing model using the first DTC, the first action, the second DTC, and the second action;
receive a third diagnostic trouble code (DTC) associated with a third vehicle at a third time, wherein the third DTC indicates a third vehicle fault, wherein the third vehicle is the first vehicle type;
assign, by the natural language processing model, a first weighting value to the first DTC and first action and a second weighting value to the second DTC and second action based on the third vehicle being the first vehicle type; and
determine, by the natural language processing model, a third action and a first probability, and a fourth action and a second probability, wherein the first probability is a probability that the third action will resolve the third vehicle fault, and wherein the second probability is a probability that the fourth action will resolve the second vehicle fault.

12. The non-transitory computer-readable medium of claim 11, wherein the one or more processors are further configured to execute the computer-executable instructions to:
receive a fourth diagnostic trouble code (DTC) associated with a fourth vehicle, wherein the fourth DTC indicates a fourth vehicle fault, wherein the fourth vehicle is a different type of vehicle than the first vehicle, wherein the first vehicle fault and fourth vehicle fault are associated with a first type of vehicle subsystem;
determine a fifth action that resolved the fourth vehicle fault; and
train the natural language processing model using the fourth DTC and the fifth action, wherein determining the second action, the third action, the first probability, and the second probability is also based on a third correlation between the fourth DTC and the fifth action, and wherein the natural language processing model provides, based on a determination that the first vehicle and fourth vehicle include a same type of component in the first type of vehicle subsystem, a third weighting value to the third correlation that is greater than the second weighting value.

13. The non-transitory computer-readable medium of claim 11, wherein the one or more processors are further configured to execute the computer-executable instructions to:
determine a service facility to perform the first action or the second action; and
automatically schedule a service with the service facility.

14. The non-transitory computer-readable medium of claim 11, wherein the first vehicle is an autonomous vehicle, and wherein the one or more processors are further configured to execute the computer-executable instructions to:
autonomously navigate the first vehicle to a service facility to perform the second action or the third action or automatically perform a software update for the first vehicle.

15. The system of claim 1, wherein the one or more processors are further configured to execute the computer-executable instructions to:
automatically perform a software update for the first vehicle.

16. The system of claim 1, wherein the one or more processors are further configured to execute the computer-executable instructions to:
automatically select the third action instead of the fourth action to resolve the third DTC based on at least one of: a cost associated with the third action, a length of time to complete the third action, or a longevity of a fix associated with the third action.

* * * * *